United States Patent [19]

Hoshi

[11] Patent Number: 5,271,223
[45] Date of Patent: Dec. 21, 1993

[54] EXHAUST GAS PURIFYING DEVICE OF AN ENGINE

[75] Inventor: Koichi Hoshi, Susono, Japan

[73] Assignee: Toyota Jidosha Kabushiki Kaisha, Toyota, Japan

[21] Appl. No.: 6,259

[22] Filed: Jan. 19, 1993

[30] Foreign Application Priority Data

Jan. 22, 1992 [JP] Japan .................. 4-009160

[51] Int. Cl.$^5$ .............................................. F01N 3/20
[52] U.S. Cl. ...................................... 60/276; 60/285; 123/691
[58] Field of Search ............... 60/276, 285, 289, 290; 123/691

[56] References Cited

U.S. PATENT DOCUMENTS

| 3,921,396 | 11/1975 | Nohira | 60/290 |
| 3,945,204 | 3/1976 | Knapp | 60/276 |
| 3,961,477 | 6/1976 | Grieshaber | 60/290 |
| 4,068,472 | 1/1978 | Takata | 60/276 |
| 4,087,964 | 5/1978 | Miyagi | 60/276 |
| 4,231,220 | 11/1980 | Takeda | 60/276 |
| 4,245,471 | 1/1981 | Sugasawa | 60/276 |
| 4,251,990 | 2/1981 | Norimatsu | 60/276 |
| 4,299,089 | 11/1981 | Takeda | 60/290 |
| 4,376,569 | 3/1983 | Horikoshi | 60/276 |
| 4,809,501 | 3/1989 | Kayanuma | 123/691 |
| 4,835,964 | 6/1989 | Kume | 60/285 |
| 5,159,810 | 11/1992 | Grutter | 123/691 |
| 5,207,057 | 5/1993 | Kayanuma | 60/276 |

FOREIGN PATENT DOCUMENTS

| 3732301 | 5/1989 | Fed. Rep. of Germany | 60/276 |
| 2450946 | 11/1980 | France | 60/276 |
| 0022917 | 3/1978 | Japan | 60/276 |
| 0035181 | 3/1980 | Japan | 60/276 |
| 62-119415 | 7/1987 | Japan . | |
| 62-137355 | 8/1987 | Japan . | |
| 63-45449 | 2/1988 | Japan . | |
| 2-67022 | 5/1990 | Japan . | |

Primary Examiner—Carl S. Miller
Attorney, Agent, or Firm—Oliff & Berridge

[57] ABSTRACT

An exhaust gas purifying device including a first $O_2$ sensor, a first three-way catalyst, a secondary air feed port, a second $O_2$ sensor, and a second three-way catalyst, which are arranged in the exhaust passage in that order. When not increasing the fuel supplied, the feeding of secondary air is stopped and feedback control is performed based on the output signals of the first $O_2$ sensor and the second $O_2$ Sensor so that the air-fuel ratio of the mixture fed to the engine cylinders becomes the stoichiometric air-fuel ratio. When increasing the fuel supplied, the feedback control of the air-fuel ratio is stopped, secondary air is fed from the secondary air feed port, and the amount of secondary air is controlled so that the air-fuel ratio of the gas flowing into the second three-way catalyst becomes the stoichiometric air-fuel ratio.

15 Claims, 18 Drawing Sheets

| REGION | I | J | K |
|--------|------|------|------|
| DGn | DG₁ | DG₂ | DG₃ |

| REGION | I | J | K |
|--------|-----|-----|-----|
| EGn | EG₁ | EG₂ | EG₃ |

EXHAUST GAS PURIFYING DEVICE OF AN ENGINE

BACKGROUND OF THE INVENTION

1. Field of the Invention

The present invention relates to an exhaust gas purifying device of an engine.

2. Description of the Related Art

Known in the art is an internal combustion engine which disposes a first three-way catalyst in an engine exhaust passage, disposes a second three-way catalyst in the exhaust passage downstream of the first three-way catalyst, provides a secondary air feed port which opens to the exhaust passage between the first three-way catalyst and the second three-way catalyst, provides a secondary air feed control device which controls the amount of secondary air fed from the secondary air feed port to the exhaust passage, disposes a first air-fuel ratio sensor in the exhaust passage upstream of the first three-way catalyst, disposes a second air-fuel ratio in the exhaust passage downstream of the second three-way catalyst, supplies to the exhaust passage secondary air from the secondary air feed port while subjecting the amount of fuel supplied to feedback control based on the output signal of the first air-fuel ratio sensor when the air-fuel ratio of the mixture to be fed to the engine cylinder easily becomes rich, such as during deceleration or idling, stops the supply of the secondary air from the secondary air feed port at times other than deceleration or idling, and subjects the amount of the fuel supplied to feedback control based on the output signals of the first air-fuel ratio sensor and the second air-fuel ratio sensor so that the air-fuel ratio becomes the stoichiometric air-fuel ratio (Japanese Unexamined Patent Publication (Kokai) No. 63-45449).

In such an internal combustion engine, the air-fuel ratio of the mixture supplied to the engine cylinder easily becomes rich at times of deceleration or idling even if the amount of the fuel supplied is subjected to feedback control based on the output signal of the first air-fuel ratio sensor so as to make the air-fuel ratio the stoichiometric air-fuel ratio. In this case, if the mixture supplied into the engine cylinder becomes rich, unburnt HC, CO, and a large amount of $H_2S$ and $SO_3$ producing an exhaust odor are produced due to the lack of oxygen. At this time, even if a three-way catalyst is provided in the exhaust passage, there is almost no oxidation reaction of the unburnt HC, CO, etc. due to the lack of oxygen. Therefore, at this time, a large amount of unburnt HC, CO, etc. is discharged into the atmosphere.

Therefore, in this internal combustion engine, when the air-fuel ratio of the mixture supplied to the engine cylinder easily becomes rich such as during deceleration or idling, a large amount of secondary air is fed into the exhaust passage from the secondary air feed port to give the exhaust gas an excess of air, that is, to make the gas flowing into the second three-way catalyst lean, by which the oxidation reaction of the unburnt HC, CO, etc. in the second three-way catalyst is promoted and the discharge of unburnt HC, CO, etc. into the atmosphere is suppressed.

In the catalyst used in this internal combustion engine, however, particles of precious metals like platinum or rhodium are usually carried on a catalyst carrier and the catalytic action of these precious metals is used for an oxidation action on the unburnt HC, CO, etc. and a reduction action of the NOx. In this case, the catalytic action proceeds on the surface of the precious metals, so the larger the surface area of the precious metals, the stronger the catalytic action. Therefore, to enlarge the surface area of the precious metals, usually, as mentioned above, the metals are carried on the catalytic carrier in a particle form.

In the case of the above second three-way catalyst, however, when the gas flowing into the catalyst becomes lean and the heating action of the exhaust gas and the reaction heat of oxidation result raise the temperature of the second three-way catalyst, oxides form on the surface of the previous metal particles. These gradually grow and as a result the precious metal particles gradually increase in size. If the size of the precious metal particles increases in this way, the precious metal particles join together to form large masses, so the surface area of the precious metals becomes smaller and the catalytic action becomes weaker, that is, the problem arises of deterioration of the catalyst.

SUMMARY OF THE INVENTION

An object of the present invention is to provide an exhaust gas purifying device capable of continuing to purify the harmful components in the exhaust gas for a long time.

According to the present invention, there is provided an engine having an exhaust passage, comprising a first catalyst arranged in the exhaust passage; a second catalyst arranged in the exhaust passage downstream of the first catalyst; a secondary air feed port open to the exhaust passage between the first catalyst and the second catalyst; a first air-fuel ratio sensor arranged in the exhaust passage upstream of the first catalyst to detect an air-fuel ratio; a second air-fuel ratio sensor arranged in the exhaust passage downstream of the secondary air feed port to detect an air-fuel ratio; enrichment means for increasing an amount of fuel fed into the engine to make an air-fuel ratio of a mixture, burned in the engine, the rich side of the stoichiometric air-fuel ratio when the engine is operating in a predetermined operating state; an air-fuel ratio control means for carrying out feedback control of the air-fuel ratio of the mixture on the basis of an output signal of the first air-fuel ratio sensor so that an air-fuel ratio of gas flowing into the first catalyst becomes equal to the stoichiometric air-fuel ratio when an increasing operation of the amount of fuel by the enrichment means is not carried out, the air-fuel ratio control means stopping the feedback control when the increasing operation of the amount of fuel by the enrichment means is carried out; and a secondary air feed control means for stopping the supply of secondary air to the exhaust passage from the secondary air feed port when the increasing operation of the amount of fuel by the enrichment means is not carried out, the secondary air feed control means causing the secondary air to flow into the exhaust passage from the secondary air feed port and carrying out feedback control of an amount of secondary air fed into the exhaust passage on the basis of an output signal of the second air-fuel ratio sensor so that an air-fuel ratio of gas flowing into the second catalyst becomes equal to the stoichiometric air-fuel ratio when the increasing operation of the amount of fuel by the enrichment means is carried out.

BRIEF DESCRIPTION OF THE DRAWINGS

The present invention may be more fully understood from the description of the preferred embodiments of the invention set forth below, together with the accompanying drawings, in which.

DESCRIPTION OF THE PREFERRED EMBODIMENTS

Figure 1:
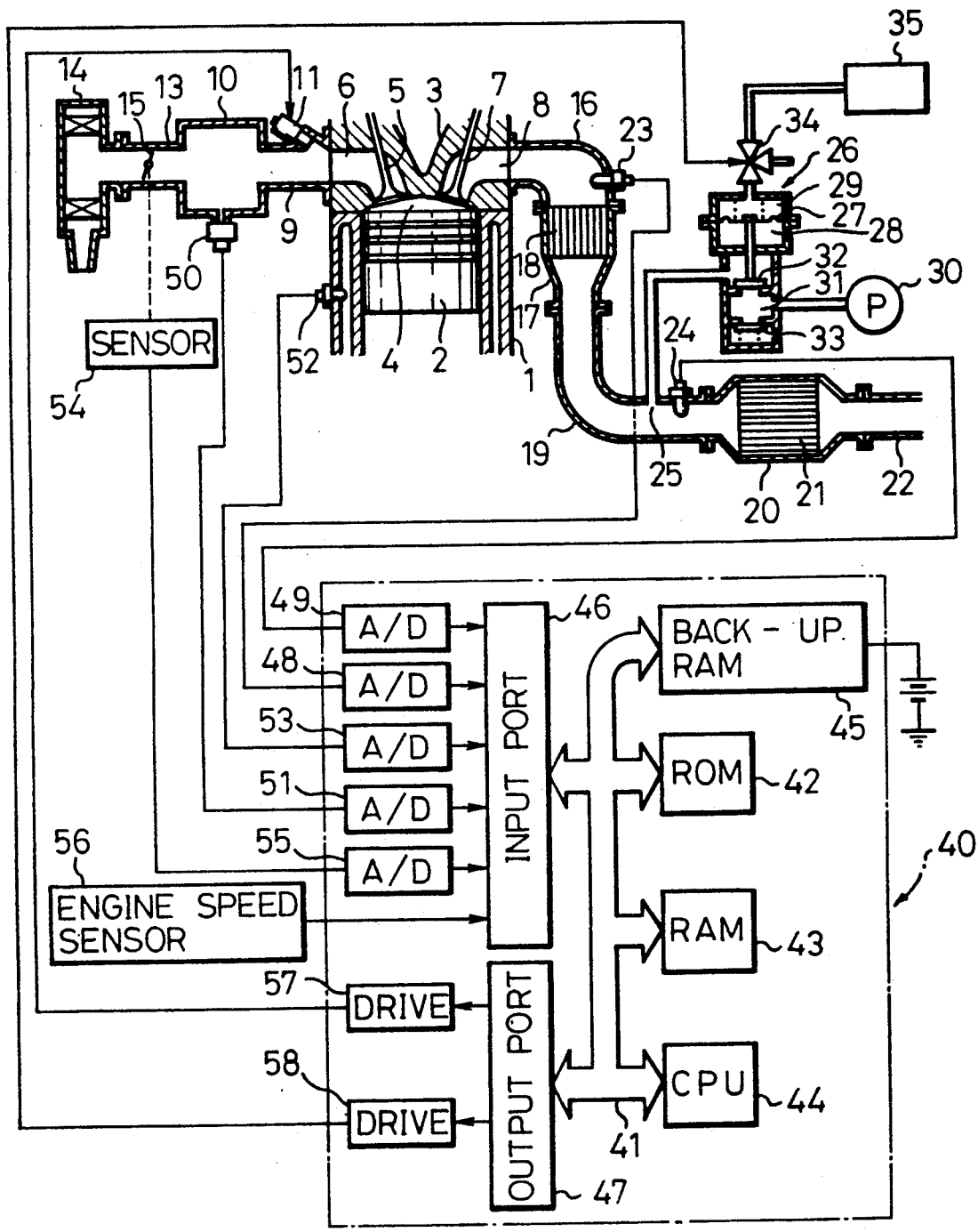
FIG. 1 is an overall view of an internal combustion engine.

Referring to FIG. 1, reference numeral 1 is a cylinder block, 2 is a piston, 3 is a cylinder head, 4 is a combustion chamber, 5 is an intake valve, 6 is an intake port, 7 is an exhaust valve, and 8 is an exhaust port. The intake ports 6 are connected to a common surge tank 10 through corresponding intake branch pipes 9. Fuel injectors 11 are disposed in the intake branch pipes 9. The surge tank 10 is connected through an intake duct 13 to an air cleaner 14. In the intake duct 12 is placed a throttle valve 15. On the other hand, the exhaust ports 8 are connected to a first catalytic converter 17 through an exhaust manifold 16. In the first catalytic converter 17 is disposed a first three-way catalyst 18. The first catalytic converter 17 is connected to a second catalytic converter 20 through an exhaust branch pipe 19. In the second catalytic converter 20 is disposed a second three-way catalyst 21. The second catalytic converter 20 can be communicated with the atmosphere through an exhaust passage 22. In the exhaust manifold 16 upstream of the first three-way catalyst 18 is disposed a first air-fuel ratio sensor, for example, an $O_2$ sensor 23. In the exhaust passage 19 upstream of the second three-way catalyst 21 is disposed a second air-fuel ratio sensor, for example, an $O_2$ sensor 24.

In the exhaust passage 19 between the second $O_2$ sensor 24 and the first three-way catalyst 18 a secondary air feed port 25 opens. The amount of secondary air fed from the secondary air feed port 25 is controlled by a secondary air feed control device 26. The secondary air feed control device 26 is provided with a vacuum chamber 29 which is separated from an atmospheric pressure chamber 28 by a diaphragm 27, a secondary air chamber 31 connected to an air discharge port of an air pump 30 driven by the engine, a control valve 32 connected to the diaphragm 27 and controlling the amount of secondary air sent into the secondary air feed port 25 from the secondary air chamber 31, and a pressure regulating valve 33 for maintaining constant the air pressure in the secondary air chamber 31. When the control valve 32 opens, the secondary air in the secondary air chamber 31 is fed from the secondary air feed port 25 to the exhaust passage 19.

The vacuum chamber 29 is connected through a solenoid valve 34 communicable to the atmosphere to a vacuum tank 35 maintained at a constant vacuum by a vacuum pump driven by the engine, for example. The vacuum chamber 29 is selected connected to the vacuum tank 35 and the atmosphere by the switching action of the solenoid valve 34. The percentage of time that the vacuum chamber 29 is connected to the vacuum tank 35, that is, the duty ratio, is controlled based on the output signal of an electronic control unit 40. In this case, the larger the percentage of time the vacuum chamber 29 is connected to the vacuum tank 35, the larger the vacuum in the vacuum chamber 29, so the larger the opening of the control valve 32 and therefore the larger the duty ratio, the more the amount of secondary air fed from the secondary air feed port 25 to the exhaust passage 19 can be increased, it is learned.

The electronic control unit 40 is provided with a read only memory (ROM) 42, a random access memory (RAM) 43, a microprocessor (CPU) 44, a backup RAM 45 connected to the power supply at all times, an input port 46, and an output port 47, all mutually connected by a bidirectional bus 41. The output signal of the first $O_2$ sensor 23 is input through an AD converter 48 to the input port 46, while the output signal of the second $O_2$ sensor 24 is input through an AD converter 49 to the input port 46. A pressure sensor 50 is attached to the surge tank 10 and issues an output voltage proportional to the absolute voltage in the surge tank 10. The output voltage of the pressure sensor 50 is input through an AD converter 51 to the input port 46. A water temperature sensor 52 is attached to the cylinder block 1 and issues an output voltage proportional to the engine coolant water temperature. The output voltage of the water temperature sensor 52 is input through an AD converter 53 to the input port 46. Further, a throttle sensor 54 is attached to the throttle valve 15 and issues an output voltage proportional to the degree of opening of the throttle. The output voltage of the throttle sensor 54 is input through an AD converter 55 to the input port 46. Further, an engine speed sensor 56 issuing an output pulse expressing the engine rotational speed is connected to the input port 46. On the other hand, the output port 47 is connected through the corresponding drive circuits 57 and 58 to the fuel injector 11 and the solenoid valve 34.

As shown in FIG. 1, in this embodiment of the present invention, a pair of three-way catalysts 18 and 21 are arranged in series. The first three-way catalyst 18 is provided near the exhaust port 8 so as to rise in temperature and be able to start the purification action of the exhaust gas quickly after the start of the engine. On the other hand, seen from the viewpoint of starting the purification action of the exhaust gas quickly after the start of the engine, the three-way catalysts 18 and 21 as a whole are preferably disposed near the exhaust port 8, but there is not sufficient space around the engine proper to place the three-way catalysts 18 and 21 as a whole and therefore the three-way catalyst is divided into the first three-way catalyst 18 and the second three-way catalyst 21, just the first three-way catalyst 18 is arranged near the exhaust port 8, and the second three-way catalyst 21 is arranged downstream from the first three-way catalyst 18.

Note that the three-way catalysts 18 and 21 exhibit their highest purification efficiencies when the ratio of the amount of fuel and the amount of air fed in the upstream of the three-way catalysts 18 and 21 becomes the stoichiometric air-fuel ratio. In this case, the air-fuel ratio of the gas flowing into the first three-way catalyst 18 matches the air-fuel ratio of the mixture fed to the engine cylinder, so when the air-fuel ratio of the mixture fed to the engine cylinder is maintained at the stoichiometric air-fuel ratio, the purification efficiency by the first three-way catalyst 18 becomes highest. Further, when no secondary air is fed from the secondary air feed port 25, similarly, when the air-fuel ratio of the mixture fed to the engine cylinder is maintained at the stoichiometric air-fuel ratio, the purification efficiency by the second three-way catalyst 21 becomes the highest.

As opposed to this, when secondary air is fed from the secondary air feed port 25, the amount of air fed upstream of the second three-way catalyst 21 becomes the sum of the amount of air fed to the combustion chamber 4 through the intake port 6 and the amount of secondary air and therefore, in this case, when the ratio of the amount of fuel injected from the fuel injector 11 and the sum of the above two amounts of air is held at the stoichiometric air-fuel ratio, the purification efficiency by the second three-way catalyst 21 becomes the highest.

In this embodiment of the present invention, the fuel injection time TAU is calculated based on the following equation:

TAU=TP . (1+FOTP) . FAF . C

Here, TP is the basic fuel injection time, FOTP is the increasing rate for preventing overheating of the three-way catalyst 18, FAF is the feedback correction coefficient, and C is another correction coefficient.

The basic fuel injection time TP is the injection time where the air-fuel ratio becomes the stoichiometric air-fuel ratio when fuel is injected from the fuel injector 11 for exactly the basic fuel injection time TP. The basic fuel injection time TP is found in advance by experimentation and is stored in advance in the ROM 42 in the form of the map shown in FIG. 2 as a function of the absolute pressure PM in the surge tank 10 and the engine speed NE.

The correction coefficient C is a coefficient for increasing the fuel when warming up the engine or increasing the feed when accelerating. When the fuel is not increased when warming the engine or accelerating, the correction coefficient C is fixed at 1.0.

The feedback correction coefficient FAF is a coefficient for controlling the air-fuel ratio of the mixture fed to the engine cylinder to the stoichiometric air-fuel ratio. In this embodiment of the present invention, when the increasing rate FOTP is zero, that is, when no increasing operation is performed based on the increasing rate FOTP, the air-fuel ratio of the mixture fed into the engine cylinder is controlled to the stoichiometric air-fuel ratio by the feedback correction coefficient FAF. At that time, the supply of secondary air from the secondary air feed port 25 is stopped. The control of the feedback correction coefficient FAF at this time is performed based on the output signal of the first $O_2$ sensor 23. The output signal of the second $O_2$ sensor 24 is used supplementarily for the control of the feedback correction coefficient FAF. Therefore, first, an explanation will be made of the main feedback control of the air-fuel ratio based on the output signal of the first $O_2$ sensor 23.

Figure 4:
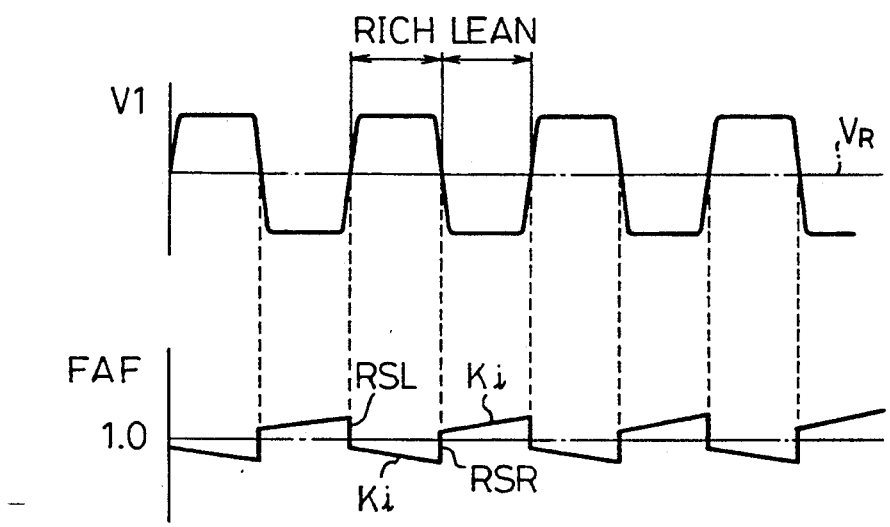
FIG. 4 is a view of the changes in the feedback correction coefficient FAF.

FIG. 4 shows the changes of the output voltage V1 of the first $O_2$ sensor 23 and the feedback correction coefficient FAF. The first $O_2$ sensor 23 issues an output voltage of about 0.1 V when the air-fuel ratio of the mixture fed to the engine cylinder becomes larger than the stoichiometric air-fuel ratio, that is, when the ratio is lean, and issues an output voltage of about 0.9 V when the air-fuel ratio of the mixture fed to the engine cylinder is smaller than the stoichiometric air-fuel ratio, that is, the ratio is rich. In other words, the first $O_2$ sensor 23 issues an output voltage of about 0.1 V when the air-fuel ratio of the gas flowing into the first three-way catalyst 18 is lean and issues an output voltage of about 0.9 V when the air-fuel ratio of the gas flowing into the first three-way catalyst 18 is rich. The feedback correction coefficient FAF is mainly controlled based on the output voltage V of the first $O_2$ sensor 23.

Figure 6:
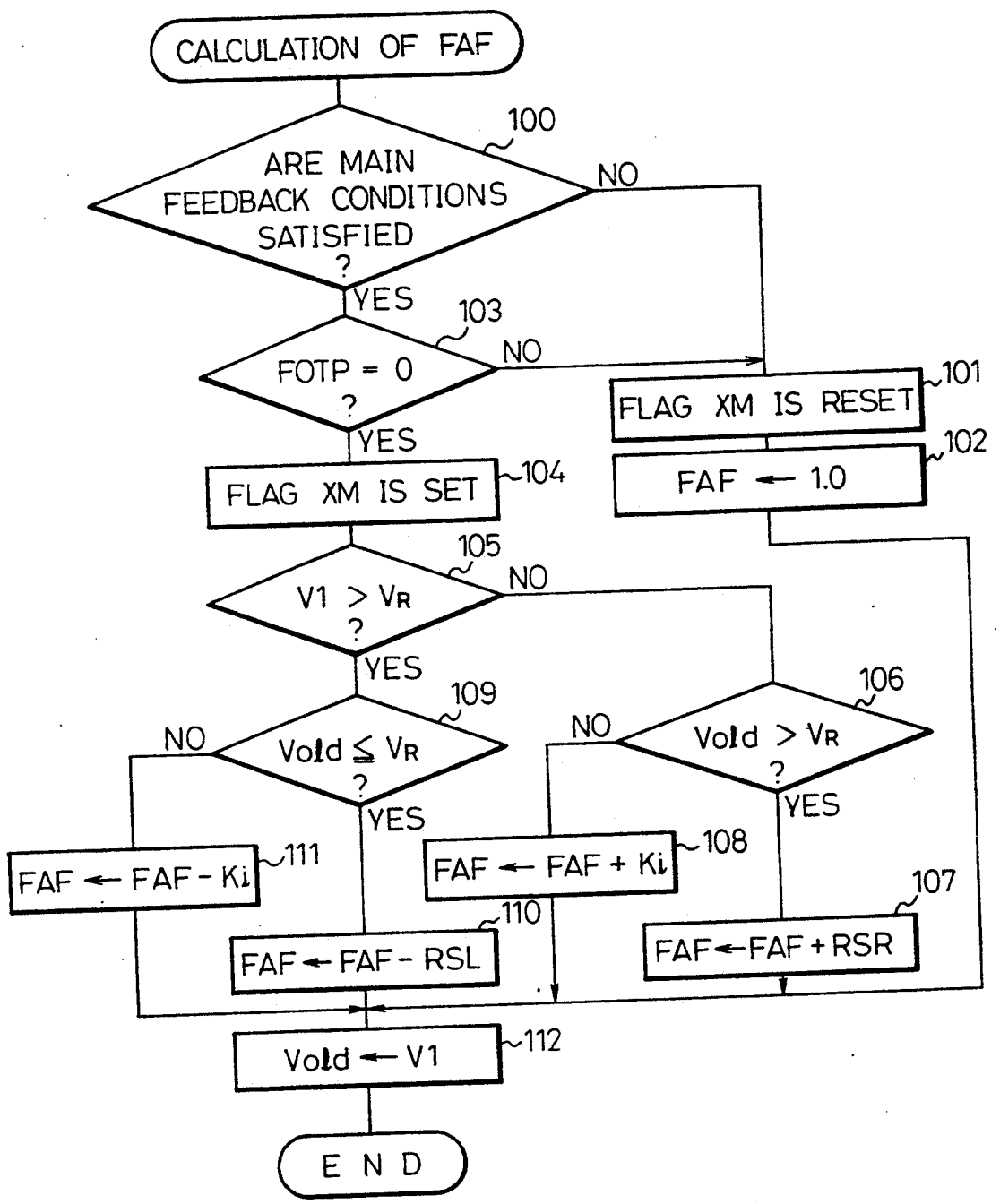
FIG. 6 is a flow chart of the control of the feedback correction coefficient FAF.

FIG. 6 shows the control routine of the feedback correction coefficient FAF performed based on the output voltage V1 of the first $O_2$ sensor 23. The routine is, for example, executed by interruption every predetermined time interval.

Referring to FIG. 6, first, at step 100, it is determined if the main feedback conditions for the feedback performed based on the output voltage V1 of the first $O_2$ sensor 23 stand. For example, when the temperature of the first $O_2$ sensor 23 becomes sufficiently high, the engine coolant water temperature becomes, for example, over 70° C., and the correction coefficient C used for the calculation of the fuel injection time TAU is 1.0, it is determined that the main feedback conditions stand. When the main feedback conditions do not stand, the routine proceeds to step 101, where the flag XM showing that feedback control is performed is reset. Next, at step 102, the feedback correction coefficient FAF is fixed to 1.0 and the routine proceeds to step 112. At step 112, the output voltage V1 of the first $O_2$ sensor 23 is made $V_{old}$ and the processing cycle is ended.

On the other hand, when the main feedback conditions stand, the routine proceeds from step 100 to step 103, where it is determined if the increasing rate FOTP used for the calculation of the fuel injection time TAU is zero. When FOTP is not zero, that is, when a fuel increasing operation is performed, the routine proceeds to step 101. Steps 102 and 112 are then passed through and the processing cycle is ended. As opposed to this, when the increasing rate FOTP is zero, that is, the fuel increasing operation is not being performed, the routine proceeds to step 104, where the flag XM is set, then the routine proceeds to step 105.

At step 105, it is determined if the output voltage V1 of the first $O_2$ sensor 23 is higher than a reference voltage $V_R$ of about 0.45 V (FIG. 4). When $V1 \leq V_R$, that is, when the ratio is lean, the routine proceeds to step 106, where it is determined if the output voltage $V_{old}$ of the first $O_2$ sensor 23 at the time of the previous interruption was higher than the reference voltage $V_R$. When $V_{old} > V_R$, that is, when the ratio was rich at the time of the previous interruption, it is determined that the ratio changed from rich to lean in the time from the previous interruption to the current interruption. At this time, the routine proceeds to step 107, where a predetermined skip value RSR is added to the feedback correction coefficient FAF, then the routine proceeds to step 112.

On the other hand, at step 106, when it is determined that $V_{old} \leq V_R$, that is, when it is determined that the ratio was lean even at the time of the previous interruption, the routine proceeds to step 108, where a predetermined integral value $K_i$ ($K_i < <$RSR) is added to the feedback correction coefficient FAF, then the routine proceeds to step 112. Therefore, when the ratio changes from rich to lean, the feedback correction coefficient FAF is rapidly increased by the skip value RSR and then is slowly increased, as shown in FIG. 4.

On the other hand, when it is determined at step 105 that $V1 > V_R$, that is, it is determined that the ratio is rich, the routine proceeds to step 109, where it is determined if the output voltage $V_{old}$ of the first $O_2$ sensor 23 at the time of the previous interruption was lower than the reference voltage $V_R$. When $V_{old} \leq V_R$, that is, the ratio was lean at the time of the previous interruption, it is determined that the ratio changed from lean to rich from the time of the previous interruption to the current interruption. At this time, the routine proceeds to step 110, where a predetermined skip value RSL is subtracted from the feedback correction coefficient FAF, then the routine proceeds to step 112.

On the other hand, when it is determined at step 108 that $V_{old} > V_R$, that is, when it is determined that the ratio at the time of the previous interruption was rich, the routine proceeds to step 111, where a predetermined integral value $K_i$ ($K_i < <$RSL) is subtracted from the feedback correction coefficient FAF, then the routine proceeds to step 112. Therefore, when the ratio changes from lean to rich, the feedback correction coefficient FAF is rapidly reduced by exactly the skip value RSL and then is slowly reduced, as shown in FIG. 4, it is learned. In this way, if the air-fuel ratio becomes lean, the feedback correction coefficient FAF becomes larger and the amount of fuel injection is increased, while if the air-fuel ratio becomes rich, the feedback correction coefficient becomes smaller and the amount of fuel injection is reduced, therefore the air-fuel ratio is maintained at the stoichiometric air-fuel ratio.

The first $O_2$ sensor 23, however, is sensitive to fluctuations in the air-fuel ratio of the mixture in the engine cylinder since it is provided near the exhaust port 8. Therefore, it is possible to perform feedback control with a good response by feedback control of the air-fuel ratio based on the output signal of the first $O_2$ sensor 23. If the first $O_2$ sensor 23 is attached near the exhaust port 8 in this way, however, the exhaust gas exhausted from a specific cylinder will mainly flow around the first $O_2$ sensor 23 and therefore the air-fuel ratio of the gas exhausted from all the cylinders will not be able to be accurately detected in some cases. Further, if the first $O_2$ sensor 23 is attached near the exhaust port 8 in this way, the first $O_2$ sensor 23 will be exposed to high temperatures, so will easily deteriorate and therefore the air-fuel ratio will not be able to be detected accurately in some cases here too. In these causes, if the feedback correction coefficient FAF is controlled by just the output signal of the first $O_2$ sensor 23, the air-fuel ratio will deviate somewhat with respect to the stoichiometric air-fuel ratio overall. Thus, to eliminate the deviation of the air-fuel ratio from the stoichiometric air-fuel ratio, in the embodiment of the present invention, the feedback correction coefficient FAF is corrected using the output signal of the second $O_2$ sensor 24.

That is, the gases exhausted from the cylinders are mixed together when passing through the first three-way catalyst 18 and therefore the gases exhausted from the cylinders are uniformly led around the second $O_2$ sensor 24. Further, the second $O_2$ sensor 24 is not exposed to as high a temperature as the first $O_2$ sensor 23, so suffers from almost no heat deterioration. Therefore, the second $O_2$ sensor 24 accurately detects the air-fuel ratio of the gases exhausted from all the cylinders at all times.

Figure 5:
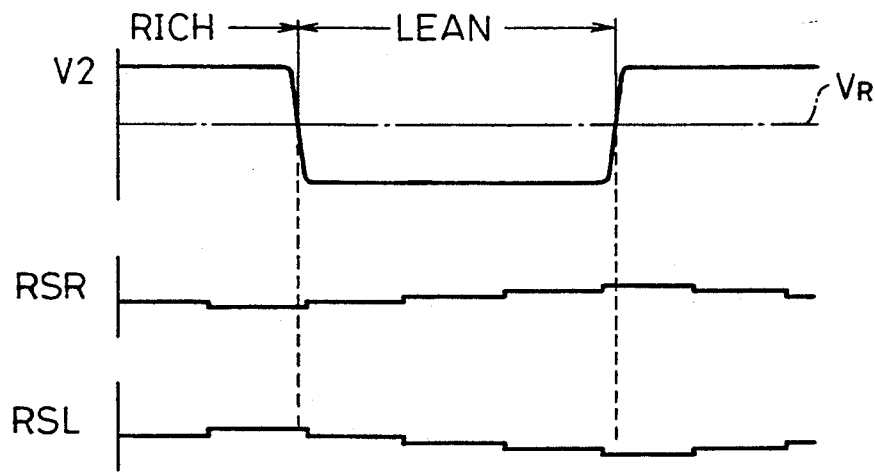
FIG. 5 is a graph of the changes in the skip values RSR and RSL.

FIG. 5 shows the output voltage V2 of the second $O_2$ sensor 24. As shown in FIG. 5, the second $O_2$ sensor 24 issues an output voltage of about 0.1 V when the air-fuel ratio of the gas flowing around the second $O_2$ sensor 24 is lean and issues an output voltage of about 0.9 V when the air-fuel ratio of the gas flowing around the second $O_2$ sensor 24 is rich. In this case, looking at the air-fuel ratio detected by the second $O_2$ sensor 24, when the air-fuel ratio of the gas flowing to the first three-way catalyst 18 deviates to the lean side overall, the air-fuel ratio detected by the second $O_2$ sensor 24 becomes lean, while when the air-fuel ratio of the gas flowing to the first three-way catalyst 18 deviates to the rich side overall, the air-fuel ratio detected by the second $O_2$ sensor 24 becomes rich.

Therefore, in this embodiment of the present invention, when the air-fuel ratio detected by the second $O_2$ sensor 24 is lean, the skip value RSR is gradually increased and the skip value RSL is gradually decreased, while when the air-fuel ratio detected by the second $O_2$ sensor 24 is rich, the skip value RSR is gradually decreased and the skip value RSL is gradually increased. If the skip value RSR is gradually increased and the skip value RSL is gradually decreased, the feedback correction coefficient FAF becomes larger overall and, conversely, if the skip value RSR is gradually decreased and the skip value RSL is gradually increased, the feedback correction coefficient FAF becomes smaller overall, so the air-fuel ratio of the gas flowing into the first three-way catalyst 18 is maintained accurately at the stoichiometric air-fuel ratio.

Figure 7:
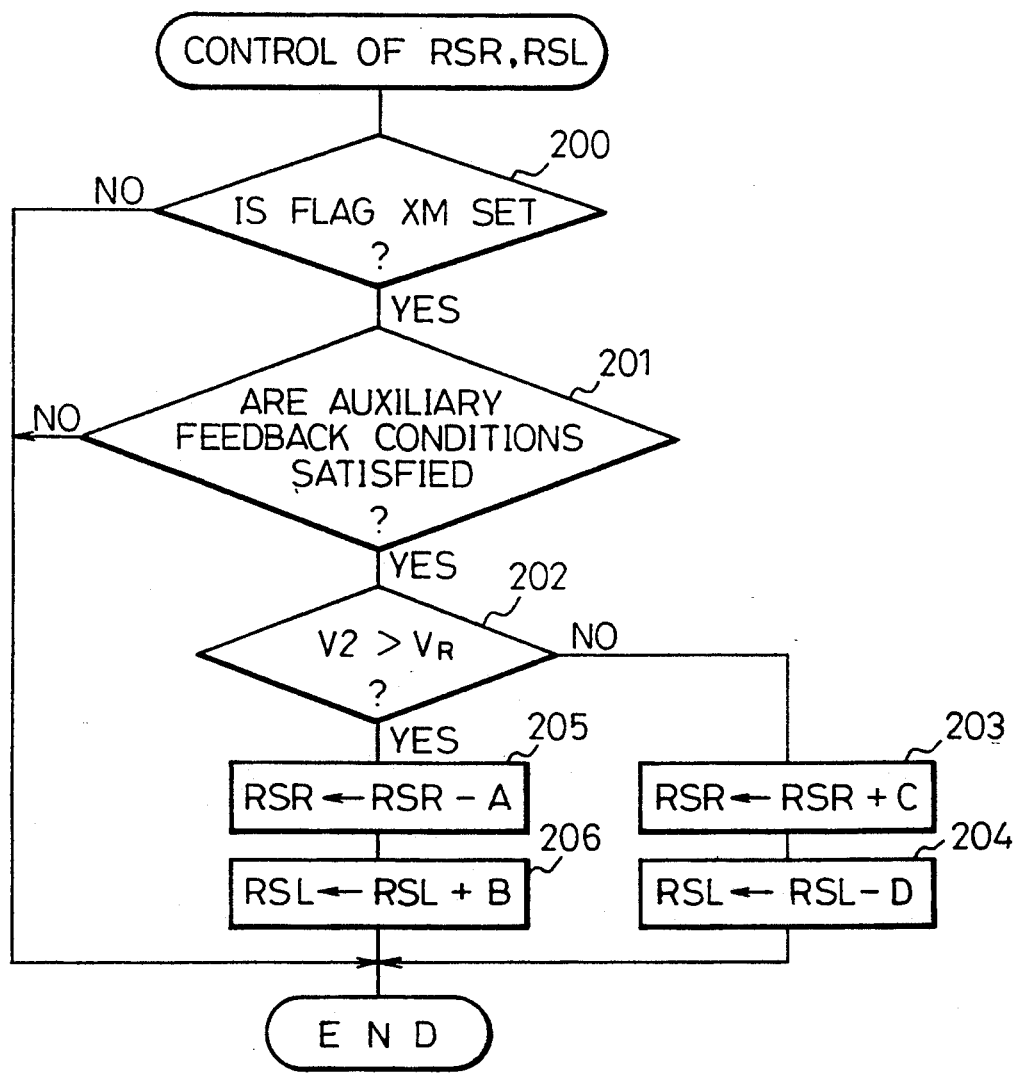
FIG. 7 is a flow chart of the control of the skip values RSR and RSL.

FIG. 7 shows the routine for control of the skip values RSR and RSL based on the output voltage V2 of the second $O_2$ sensor 24. The routine is executed by interruption every predetermined time interval.

Referring to FIG. 7, first, at step 200, it is determined if the flag XM is set. When the flag XM is set, that is, when feedback control by the first $O_2$ sensor 23 is being performed, the routine proceeds to step 201, where it is determined if the auxiliary feedback conditions based on the second $O_2$ sensor 24 stand. When the temperature of the second $O_2$ sensor 24 becomes sufficiently high, it is determined that the auxiliary feedback conditions stand. When the auxiliary feedback conditions stand, the routine proceeds to step 202.

At step 202, it is determined if the output voltage V2 of the second $O_2$ sensor 24 is higher than a reference voltage $V_R$ of about 0.45 V (FIG. 5). When $V2 \leq V_R$, that is, when the ratio is lean, the routine proceeds to step 203, where a predetermined value C is added to the skip value RSR, then at step 204, a predetermined value D is subtracted from the skip value RSL. As opposed to this, when $V_2 > V_R$, that is, when the ratio is rich, the routine proceeds to step 205, where a predetermined value A is subtracted from the skip value RSR, then at step 206, a predetermined value B is added to the skip value RSL. Note that in this case, the skip values RSR and RSL are both positive numbers. Further, it is possible to delete steps 204 and 206 and add and subtract just RSR and find RSL from the relationship of $RSR + RSL = 0.1$.

When in this way the increasing rate FOTP is zero, that is, when no increasing operation of the fuel is performed, the air-fuel ratio of the gas flowing to the first three-way catalyst 18 is accurately maintained at the stoichiometric air-fuel ratio and, at the same time, the air-fuel ratio of the gas flowing to the second three-way catalyst 21 is accurately maintained at the stoichiometric air-fuel ratio. Therefore, the unburnt HC, CO, NOx, etc. can be purified well by the three-way catalysts 18 and 21.

If the air-fuel ratio is maintained at the stoichiometric air-fuel ratio, however, the temperature of the fuel in the engine cylinder rises along with an increase of the amount of the intake air fed to the engine cylinder and, as a result, the exhaust gas rises in temperature, so the problem arises of overheating of the first three-way catalyst 18, in particular. Therefore, in this embodiment of the present invention, when the amount of intake air fed to the engine cylinder increases, the feedback control of the air-fuel ratio is stopped, the feedback correction coefficient FAF is fixed to 1.0, the increasing rate FOTP is made a positive value, and the mixture fed to the engine cylinder is made rich. If the mixture fed to the engine cylinder is made rich, the temperature of the fuel falls due to the latent heat of evaporation of the fuel and therefore the temperature of the exhaust gas falls. Further, almost no oxygen is present in the exhaust gas, so there is almost no oxidation reaction of the unburnt HC, CO, etc., which is an exothermic reaction, and thus overheating of the three-way catalyst 18 can be prevented.

Figure 3A:
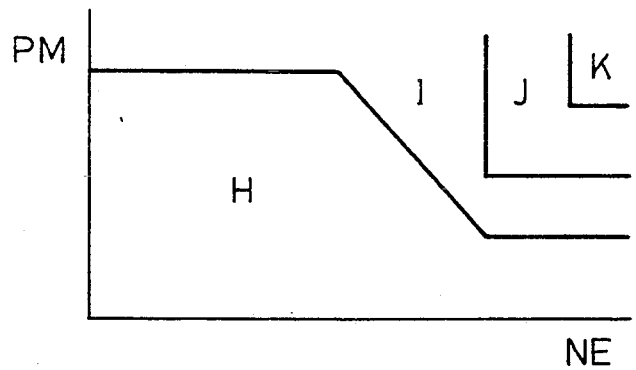
FIGS. 3A and 3B are views of the increasing rate.

In this embodiment of the present invention, the increasing rate FOTP is preset as a function of the absolute pressure PM in the surge tank 10 and the engine speed NE. This is shown in FIG. 3A. Note that in FIG. 3A, the region H shows the region where the increasing rate FOTP is zero, and the regions I, J, and K show regions where the increasing rate FOTP is set to different positive values. Note that the value of the increasing rate FOTP becomes larger the more from the region I to the region K. The increasing rate FOTP shown in FIG. 3A is stored in the ROM 42 in advance in the form of the map shown in FIG. 3B as a function of the absolute pressure PM in the surge tank 10 and the engine speed NE.

Figure 8:
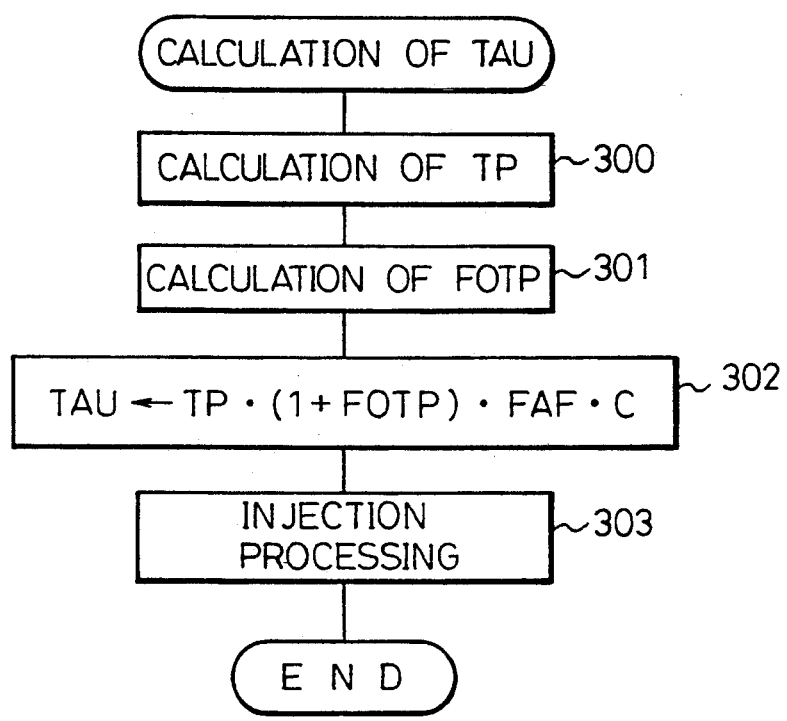
FIG. 8 is a flow chart of the calculation of the fuel injection time TAU.

FIG. 8 shows the routine for calculation of the fuel injection time TAU. This routine is executed repeatedly, for example.

Figure 2:
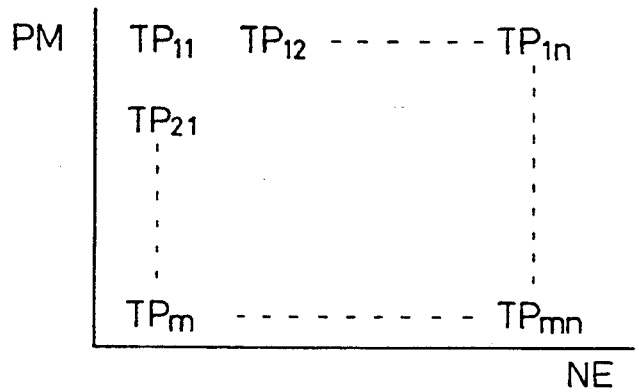
FIG. 2 is a view of the basic fuel injection time TP.
Figure 3B:
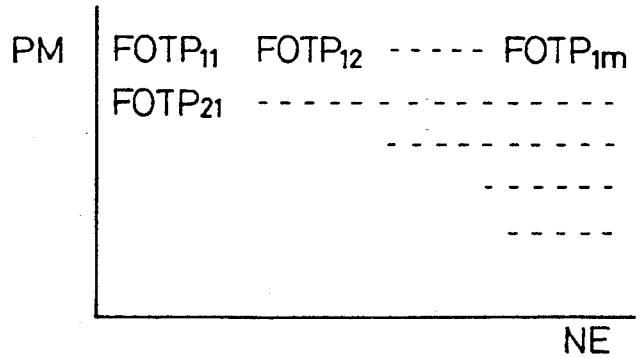

Referring to FIG. 8, first, at step 300, the basic fuel injection time TP is calculated from the map shown in FIG. 2, then at step 301, the increasing rate FOTP is calculated from the map shown in FIG. 3B. Next, at step 302, the fuel injection time TAU is calculated, then at step 303, processing for fuel injection from the fuel injector 11 is executed. In this case, in the region H in FIG. 3A, the increasing rate FOTP becomes zero, so feedback control is performed by the first $O_2$ sensor 23 and the second $O_2$ sensor 24 and the air-fuel ratio of the mixture fed to the engine cylinder is maintained accurately at the stoichiometric air-fuel ratio. As opposed to this, in the regions I, J, and K of FIG. 3A, the feedback control is stopped, the feedback correction coefficient FAF is fixed to 1.0, and the air-fuel ratio of the mixture fed to the engine cylinder becomes rich.

If the air-fuel ratio of the mixture fed to the engine cylinder becomes rich, a large amount of unburnt HC, CO, and the like is generated, but the exhaust gas does not contain much oxygen at all, so there is almost no oxidation reaction of the unburnt HC, CO, etc. in the three-way catalysts 18 and 21. Therefore, in this embodiment of the present invention, at this time, secondary air is fed from the secondary air feed port 25 to the exhaust passage 19 so that the large amount of unburnt HC, CO, etc. can be oxidized at the second three-way catalyst 21.

In this case, even if a large amount of secondary air is supplied and the air-fuel ratio of the gas flowing into the second three-way catalyst 21 is made lean, it is possible to oxidize the unburnt HC, CO, etc. If the air-fuel ratio of the gas flowing into the second three-way catalyst 21 is made lean, however, as mentioned at the start, the second three-way catalyst 21 deteriorates fast. Therefore, in this embodiment of the present invention, to ensure that the gas flowing into the second three-way catalyst 21 does not contain an excessive amount of air, the amount of the secondary air is controlled so as to maintain the air-fuel ratio of the gas flowing into the second three-way catalyst 21 at the stoichiometric air-fuel ratio. Note that even if the mixture fed to the engine cylinder becomes rich, NOx is produced and this NOx is not purified much at all by the first three-way catalyst 18. If the air-fuel ratio of the gas flowing into the second three-way catalyst 21 is maintained at the stoichiometric air-fuel ratio, however, the NOx is purified well at the second three-way catalyst 21. Therefore, maintaining the air-fuel ratio of the gas flowing into the second three-way catalyst 21 at the stoichiometric air-fuel ratio has great significance in both the senses of prevention of deterioration of the three-way catalyst and the purification of NOx.

Figures 10, 11:
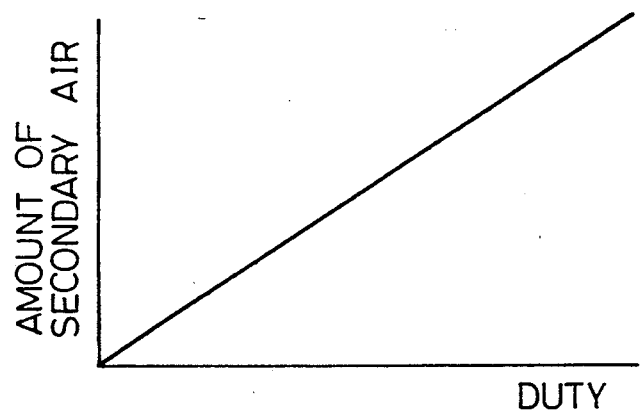
FIG. 10 is a view of the learning amount.
FIG. 11 is a view of the relationship between the duty ratio and the amount of secondary air.

In this embodiment of the present invention, the duty ratio of the control signal of the solenoid value 34 of the secondary air feed control device 26 is controlled based on the output voltage V2 of the second $O_2$ sensor 24 so as to maintain the air-fuel ratio of the gas flowing into the second three-way catalyst 21 at the stoichiometric air-fuel ratio. FIG. 11 shows the relationship between the amount of secondary air fed from the secondary air feed port 25 and the duty ratio. As will be understood from FIG. 11, the larger the duty ratio, the greater the amount of secondary air that is fed. Therefore, basically, when the air-fuel ratio of the gas flowing into the second three-way catalyst 21 becomes lean, the duty ratio is gradually reduced to gradually reduce the amount of the secondary air which is supplied, while when the air-fuel ratio of the gas flowing into the second three-way catalyst 21 becomes rich, the duty ratio is gradually increased to gradually increase the amount of the secondary air which is supplied, whereby the air-fuel ratio of the gas flowing into the second three-way catalyst 21 is maintained at the stoichiometric air-fuel ratio.

If the amount of secondary air is controlled in this way, however, when the supply of the secondary air is started or when the amount of the secondary air demanded changes, since the amount of the secondary air increases only gradually, it takes time until the demanded amount of secondary air is reached and there is the problem that the air-fuel ratio of the gas flowing into the second three-way catalyst 21 continues rich or lean. Therefore, in this embodiment of the present invention, when the supply of the secondary air is started or when the amount of the secondary air demanded changes, a learning amount $DG_n$ is introduced so that the amount of secondary air immediately becomes the demanded amount of secondary air. The sum of the learning amount $DG_n$ and the secondary air correction term GFB is used to find the duty ratio ($=DFB+DG_n$). Next, an explanation will be made referring to FIG. 9.

Figure 9:
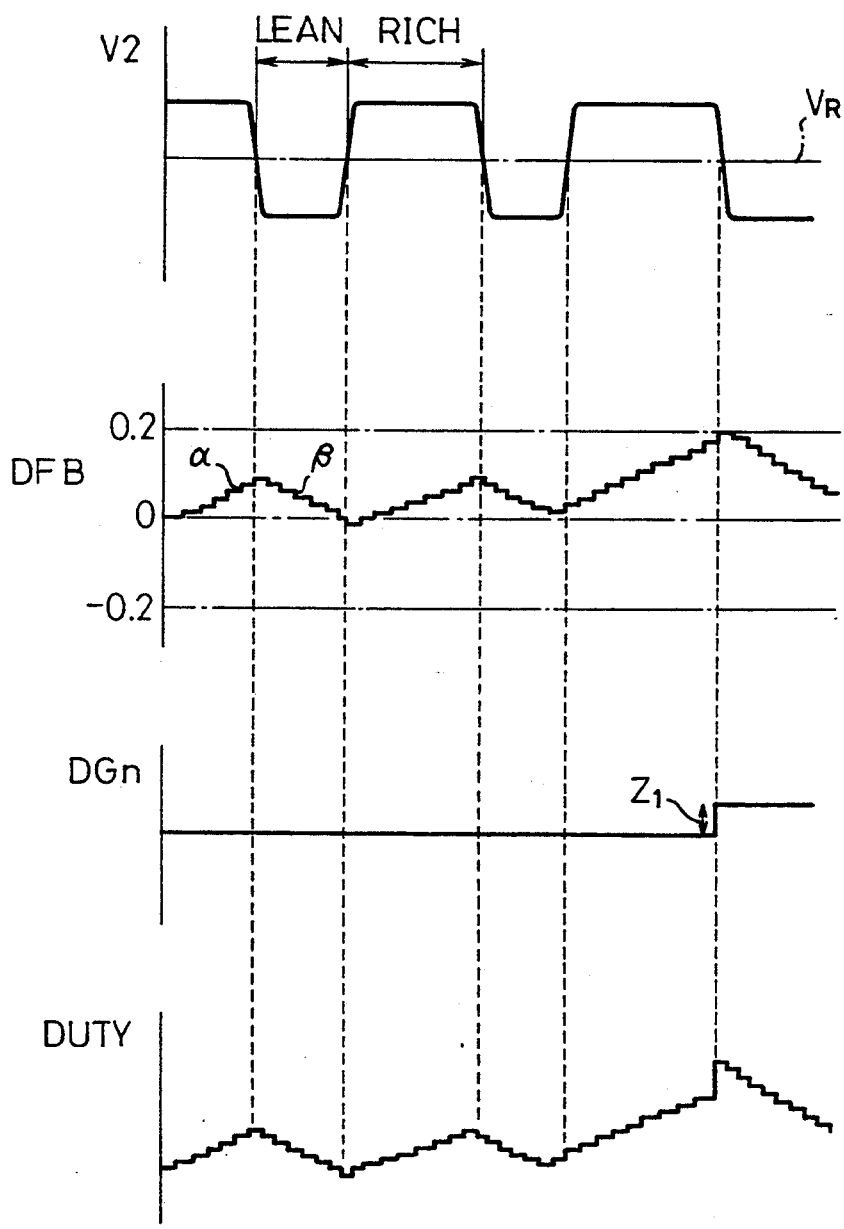
FIG. 9 is a time chart of the changes in the duty ratio.

FIG. 9 shows the output voltage V2 of the second $O_2$ sensor 24 at the time the secondary air is supplied. As mentioned earlier, the second $O_2$ sensor 24 issues an output voltage of about 0.1 V when the air-fuel ratio of the gas flowing around the second $O_2$ sensor 24, that is, the air-fuel ratio of the gas flowing into the second three-way catalyst 21, becomes lean, and issues an output voltage of about 0.9 V when the air-fuel ratio of the gas flowing into the second three-way catalyst 21 becomes rich. As shown in FIG. 9, if the air-fuel ratio of the gas flowing into the second three-way catalyst 21 becomes rich, the secondary air correction term DFB is gradually increased in steps of a predetermined amount $\alpha$ and, along with this, the duty ratio is increased. If the duty ratio is increased, the amount of the secondary air increases. If as a result the air-fuel ratio of the gas flowing into the second three-way catalyst 21 becomes lean, the secondary correction term DFB is gradually decreased in steps of a predetermined value $\beta$ and, along with this, the duty ratio is also decreased. As a result, the amount of the secondary air falls and the air-fuel ratio of the gas flowing into the second three-way catalyst 21 becomes rich. In this way, the air-fuel ratio of the gas flowing into the second three-way catalyst 21 is maintained at the stoichiometric air-fuel ratio.

If, however, as shown in FIG. 9, the secondary air correction term DFB exceeds 0.2, for example, the learning amount $DG_n$ is increased by exactly the predetermined value Z1. If the learning amount $DG_n$ is increased, the secondary air correction term DFB then fluctuates between 0.2 and $-0.2$. Therefore, the learning amount $DG_n$ is increased or decreased so that the secondary air correction term DFB becomes substantially zero. If the secondary air correction term DFB is zero, the duty ratio becomes equal to the learning amount $DG_n$, so in the end the learning amount $DG_n$ substantially expresses the duty ratio required for obtaining the demanded amount of the secondary air. Therefore, when the secondary air starts to be supplied or when the demanded amount of the secondary air changes, if the duty ratio is made the learning amount $DG_n$, the amount of the secondary air can be made to immediately match the demanded amount of secondary air.

As mentioned earlier, however, in the regions I, J, and K shown in FIG. 3A, the increasing rate FOTP becomes larger from the region I to the region K. That is, the increasing rate FOTP differs in the regions I, J, and K. If the increasing rate FOTP becomes larger, the demanded amount of the secondary air becomes larger and therefore the learning amount $DG_n$ becomes different at the regions I, J, and K of FIG. 3A. Therefore, in this embodiment of the present invention, as shown in FIG. 10, the learning amounts $DG_1$, $DG_2$, and $DG_3$ are given to the regions I, J, and K. These learning amounts $DG_1$, $DG_2$, and $DG_3$ are stored in the backup RAM 45.

On the other hand, the secondary air feed control device 26 ages after long use and therefore the amount of the secondary air supplied with respect to the duty ratio will change. Even if this aging occurs, however, the learning amount $DG_n$ substantially represents the duty ratio required for obtaining the demanded amount of secondary air. Therefore, when the supply of the secondary air is started or when the amount of the secondary air demanded changes, the amount of secondary air is immediately matched with the amount of secondary air demanded.

Figure 12:
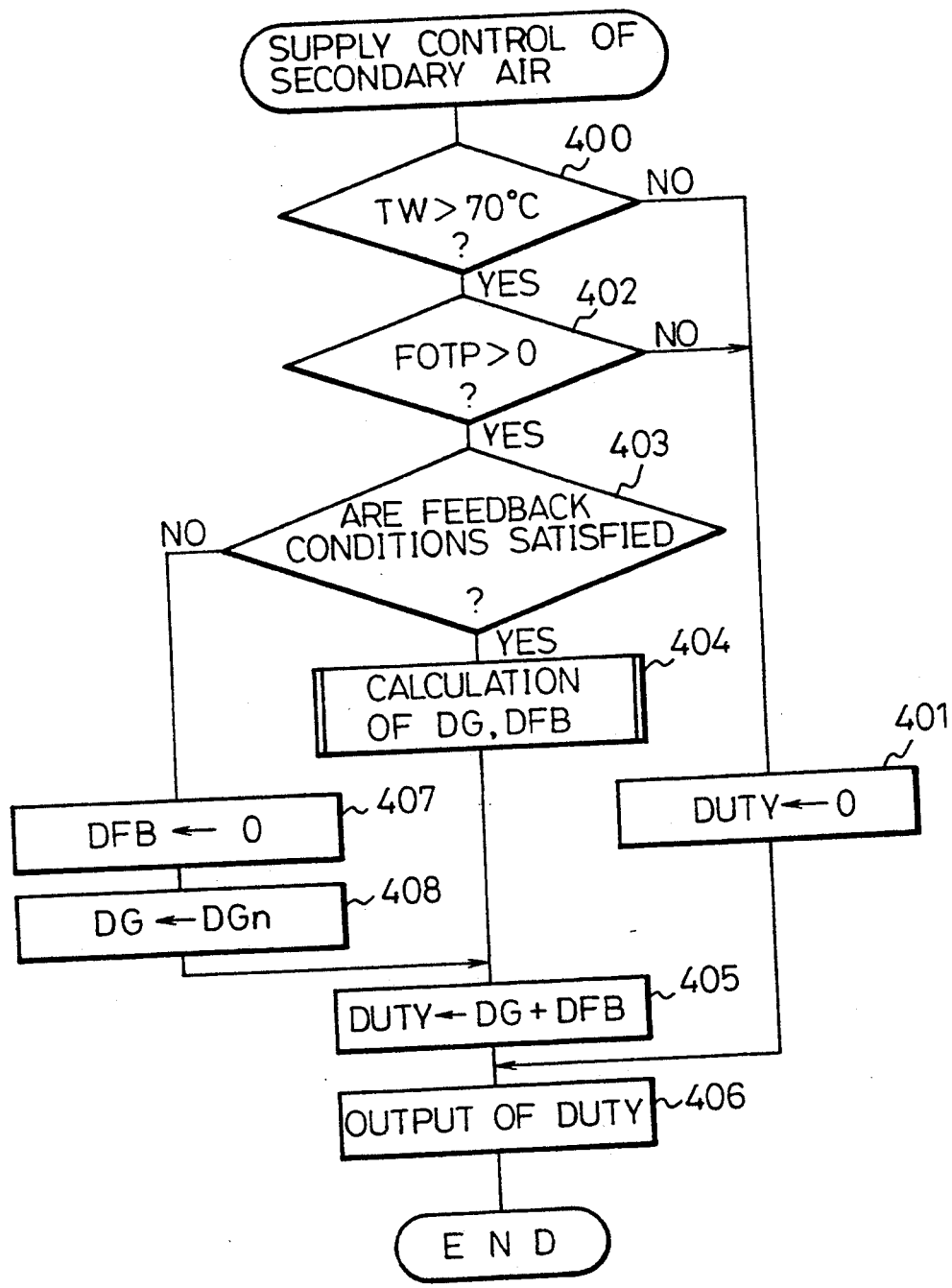
FIG. 12 is a flow chart of the control of the feed of the secondary air.
Figure 13:
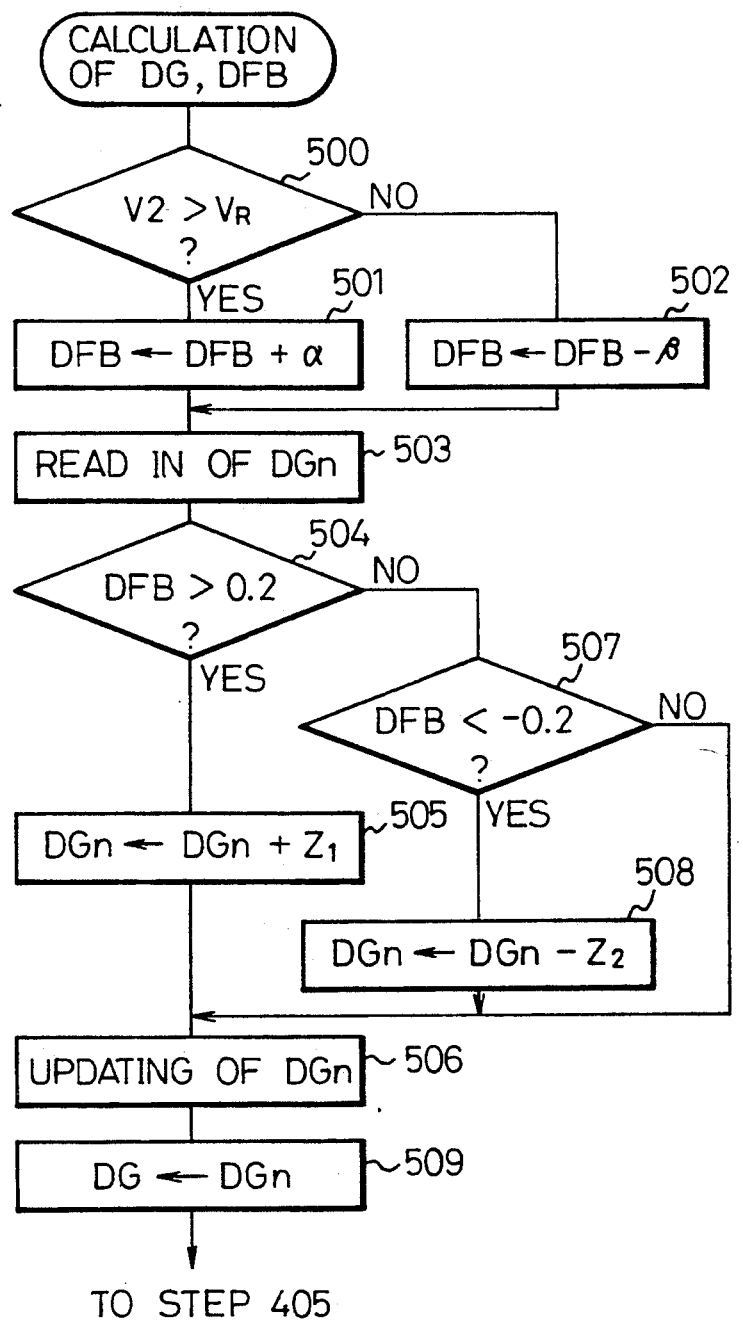
FIG. 13 is a flow chart of the calculation of the DG and DFB.

FIG. 12 and FIG. 13 show routines of the control of the feed of the secondary air explained based on FIG. 9. The routine is executed, for example, by interruption every predetermined time interval.

Referring to FIG. 12, first, at step 400, it is determined if the engine coolant water temperature TW is higher than a predetermined value, for example, 70° C. When TW$\leq$70° C., the routine proceeds to step 401, where the duty ratio is made zero, then at step 406, the duty ratio is output. At this time, the supply of the secondary air is stopped. On the other hand, when TW>70° C., the routine proceeds to step 402, where it is determined if the increasing rate FOTP is a positive value. When FOTP=0, the routine proceeds to step 401. Therefore, when no increasing operation of the fuel is performed, the supply of the secondary air is stopped, it is learned.

On the other hand, if it is determined at step 402 that FOTP>0, that is, when an increasing operation of the fuel is performed, the routine proceeds to step 403, where it is determined if the feedback conditions stand. When the temperature of the second $O_2$ sensor 24 becomes sufficiently high, it is determined that the feedback conditions stand. When it is determined that the feedback conditions stand, the routine proceeds to step 404, where the DG and DFB calculation routine shown in FIG. 13 is executed.

Referring to FIG. 13, first, at step 500, it is determined if the output voltage V2 of the second $O_2$ sensor 24 is higher than the reference value $V_R$. When V2>$V_R$, that is, when the air-fuel ratio of the gas flowing into the second three-way catalyst 21 is rich, the routine proceeds to step 501, where a predetermined value $\alpha$ is added to the secondary air correction term DFB, then the routine proceeds to step 503. As opposed to this, when V2$\leq V_R$, that is, when the air-fuel ratio of the gas flowing to the second three-way catalyst 21 is lean, the routine proceeds to step 502, where the predetermined value $\beta$ is subtracted from the secondary air correction term DFB, then the routine proceeds to step 503. At step 503, it is determined which of the regions I, J, and K shown in FIG. 3A the current operating state of the engine falls in and the learning amount $DG_1$, $DG_2$, or $DG_3$ (FIG. 10) of the region I, J, or K to which it belongs is read from the backup RAM 45.

Next, at step 504, it is determined if the secondary air correction term DFB is larger than 0.2. When DFB>0.2, the routine proceeds to step 505, where a predetermined value $Z_1$ is added to the learning amount $DG_n$ ($DG_1$, $DG_2$, or $DG_3$) read from the backup RAM 45, then the routine proceeds to step 506. On the other hand, when DFB$\leq$0.2, the routine proceeds to step 507, where it is determined if the secondary air correction term DFB is smaller than $-0.2$. When DFB $< -0.2$, the routine proceeds to step 508, where a predetermined value $Z_2$ is subtracted from the learning amount $DG_n$, then the routine proceeds to step 506. At step 506, the learning amount $DG_n$ stored in the backup RAM 45 is updated by the newly found learning amount $DG_n$. Next, at step 509, $DG_n$ is made DG and the routine proceeds to step 405 of FIG. 12.

At step 405, the sum of the learning amount DG and the secondary air correction term DFB is made the duty ratio, then the routine proceeds to step 406, where the duty ratio is output. At this time, the solenoid valve 34 is controlled based on the duty ratio an the amount of secondary air corresponding to the duty ratio is supplied. Note that when it is determined at step 403 that the feedback conditions do not stand, the routine proceeds to step 407, where the secondary air correction term DFB is made zero. Next, at step 408, the learning amount $DG_n$ stored in the backup RAM 45 and reflecting the operating state of the engine is made DG, then the routine proceeds to step 405. Therefore, at this time, the duty ratio becomes equal to the learning amount $DG_n$ and the amount of secondary air corresponding to the learning amount $DG_n$ is supplied.

Figure 14:
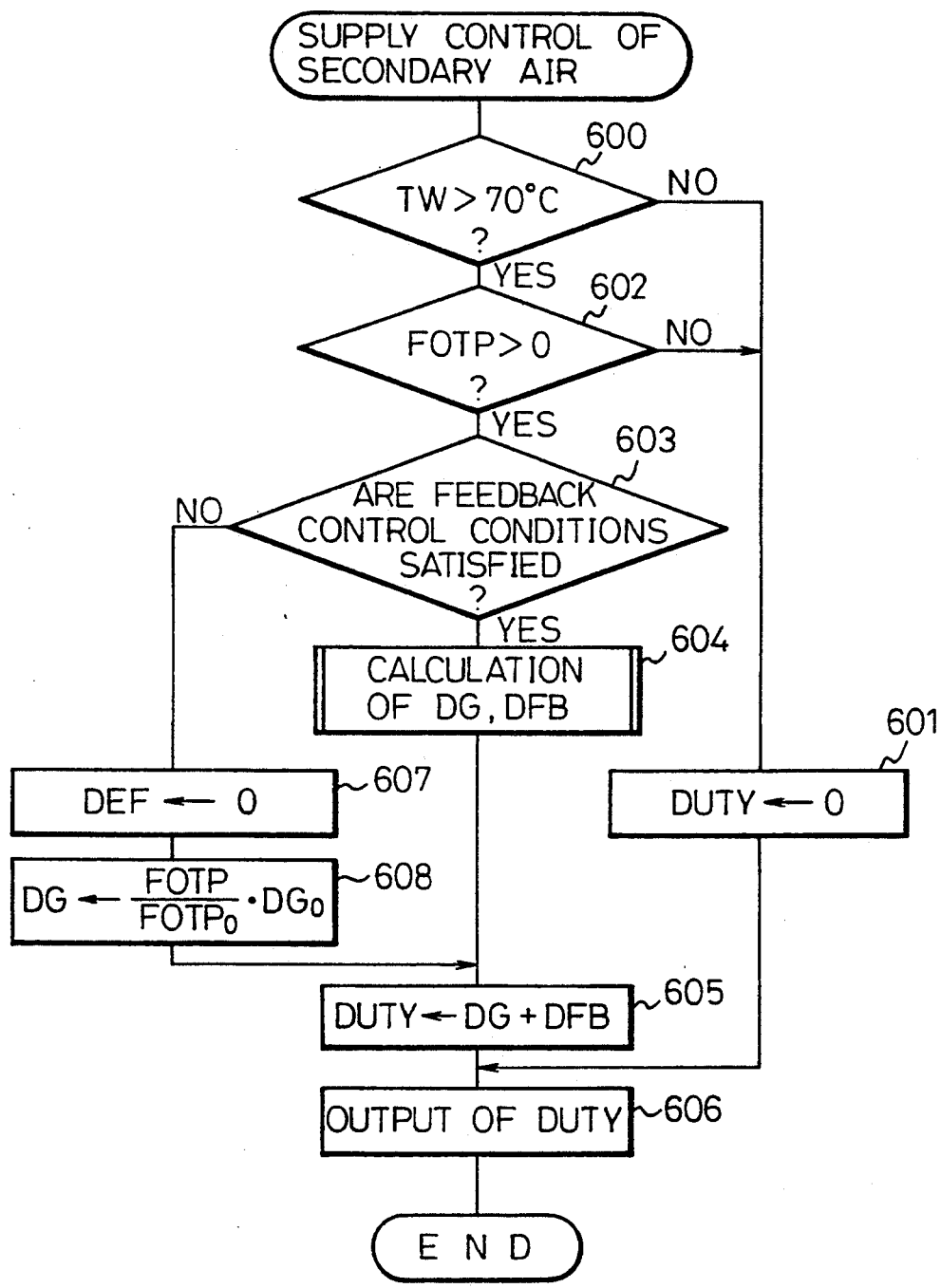
FIG. 14 is a flow chart of another example of the control of the feed of the secondary air.
Figure 15:
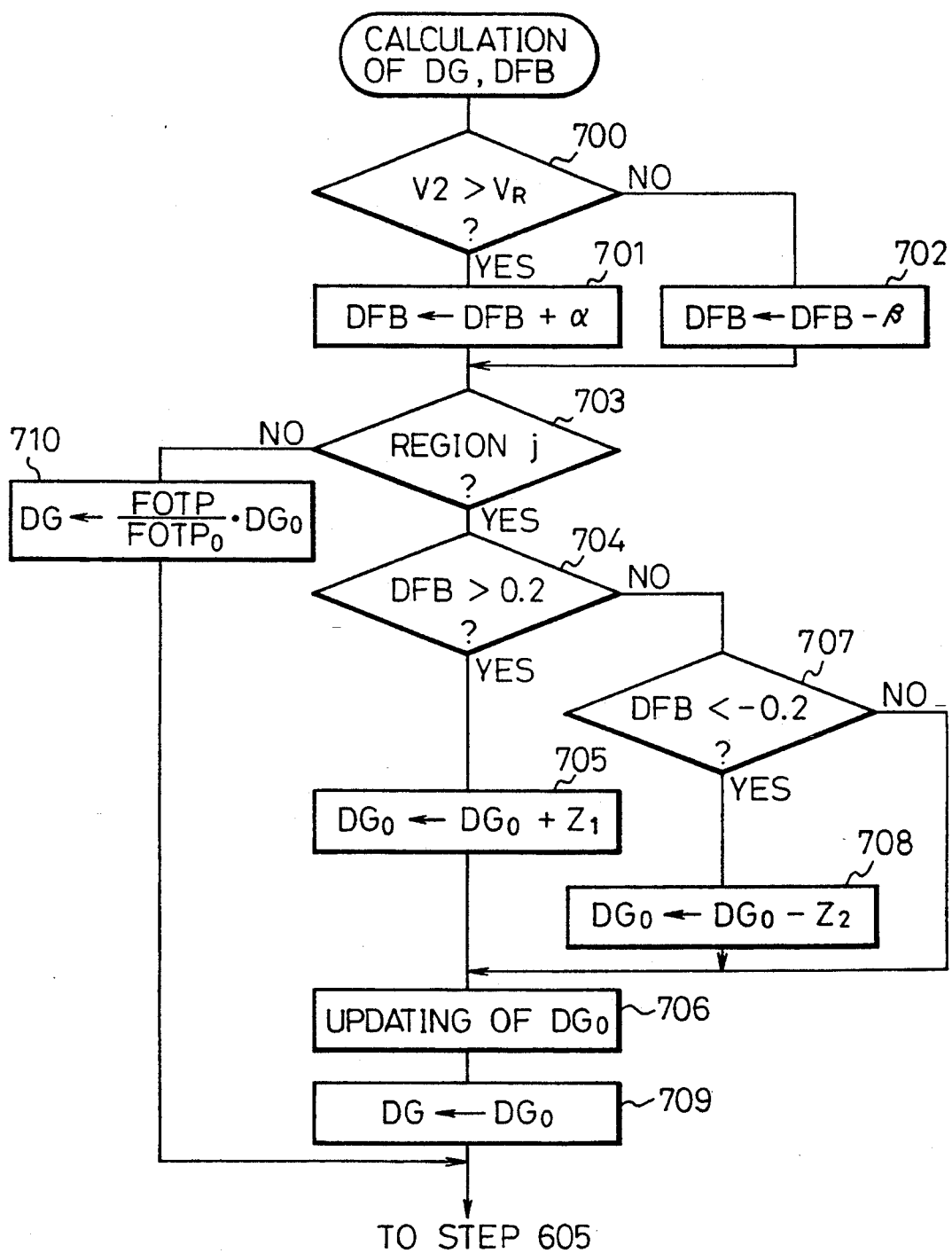
FIG. 15 is a flow chart of the calculation of the DG and DFB.

In the above embodiment, the learning amounts $DG_1$, $DG_2$, and $DG_3$ corresponding to the regions I, J, and K as shown in FIG. 10 were each stored in the backup RAM 45 and the learning amounts $DG_1$, $DG_2$, and $DG_3$ were updated separately. It is also possible, however, to calculate just the learning amount of one of the regions I, J, and K and find the learning amounts of the other regions from that learning amount. For example, it is also possible to calculate just the learning amount $DG_0$ of the region J of FIG. 10 and to find the learning amounts DG of the other regions I and K from the product of the increasing rate ratio (FOTP/FOTP$_0$) and $DG_0$. Note that here FOTP$_0$ shows the increasing rate of the region J, and FOTP shows the increasing rate of the region I or K for which the learning amount DG is to be found. FIG. 14 and FIG. 15 show the routine for control of the supply of the secondary air in the case of finding the learning amounts in this way. This routine is executed, for example, every predetermined time interval.

Referring to FIG. 14, first, at step 600, it is determined if the engine coolant water temperature TW is higher than a predetermined value, for example, 70° C. When TW$\leq$70° C., the routine proceeds to step 601, where the duty ratio is made zero, then the routine proceeds to step 606, where the duty ratio is output. At this time, the supply of the secondary air is stopped. On the other hand, when TW$>$70° C., the routine proceeds to step 602, where it is determined if the increasing rate FOTP is a positive value. When FOTP=0, the routine proceeds through step 601 to step 606, where the supply of the secondary air is stopped.

On the other hand, when it is determined at step 602 that FOTP$>$0, that is, when an increasing operation of the fuel is being performed, the routine proceeds to step 603, where it is determined if the feedback conditions stand. When the temperature of the second $O_2$ sensor 24 becomes sufficiently high, it is determined that the feedback conditions stand. When it is determined that the feedback conditions stand, the routine proceeds to step 604, where the routine for calculation of DG and DFB shown in FIG. 15 is calculated.

Referring to FIG. 15, first, at step 700, it is determined if the output voltage V2 of the second $O_2$ sensor 24 is higher than a reference value $V_R$. When V2$>V_R$, that is, when the air-fuel ratio of the gas flowing into the second three-way catalyst 21 is rich, the routine proceeds to step 701, where a predetermined value $\alpha$ is added to the secondary air correction term DFB, then the routine proceeds to step 703. As opposed to this, when V2$\leq V_R$, that is, when the air-fuel ratio of the gas flowing into the second three-way catalyst 21 is lean, the routine proceeds to step 702, where the predetermined value $\beta$ is subtracted from the secondary air correction term DFB, then the routine proceeds to step 703. At step 703, it is determined if the current operating state of the engine belongs to the region i shown in FIG. 3A. When it belongs to the region J, the routine proceeds to step 704.

At step 704, it is determined if the secondary air correction term DFB is larger than 0.2. When DFB$>$0.2, the routine proceeds to step 705, where a predetermined value $Z_1$ is added to the learning amount $DG_0$ of the region J stored in the backup RAM 45, then the routine proceeds to step 706. On the other hand, when DFB$\leq$0.2, the routine proceeds to step 707, where it is determined if the secondary air correction term DFB is smaller than $-0.2$. When DFB$<-0.2$, the routine proceeds to step 708, where a predetermined value $Z_2$ is subtracted from the learning amount $DG_0$, then the routine proceeds to step 706. At step 706, the learning amount $DG_0$ stored in the backup RAM 45 is updated by the newly found learning amount $DG_0$. Next, at step 709, $DG_0$ is made DG, and the routine proceeds to step 605 of FIG. 14.

At step 605, the sum of the learning amount DG and the secondary air correction term DFB is made the duty ratio, then the routine proceeds to step 606, where the duty ratio is output. At this time, the solenoid valve 34 is controlled based on the duty ratio and secondary air corresponding to that duty ratio is supplied.

As opposed to this, when it is determined at step 703 of FIG. 15 that the current engine operating state is not the region J, that is, it is determined that it is the region I or K, the routine proceeds to step 710, where the learning amount DG is calculated from the product of the increasing rate ratio (FOTP/FOTP$_0$) and the learning amount $DG_0$ of the region J. Here, FOTP$_0$ shows the increasing rate of the region J, while FOTP shows the increasing rate of the current operating region I or K. Next, the routine proceeds to step 605 of FIG. 14, where the duty ratio is calculated, then at step 606, the duty ratio is output.

On the other hand, when it is determined at step 603 that the feedback conditions do not stand, the routine proceeds to step 607, where the secondary air correction term DFB is made zero. Next, at step 608, the learning amount DG is calculated from the product of the increasing rate ratio (FOTP/FOTP$_0$) and the learning amount $DG_0$ of the region J, then the routine proceeds to step 605. Therefore, at this time, the duty ratio becomes a fixed value determined by (FOTP/FOTP$_0$).$DG_0$ and the secondary air corresponding to this fixed value is supplied.

Figure 16:
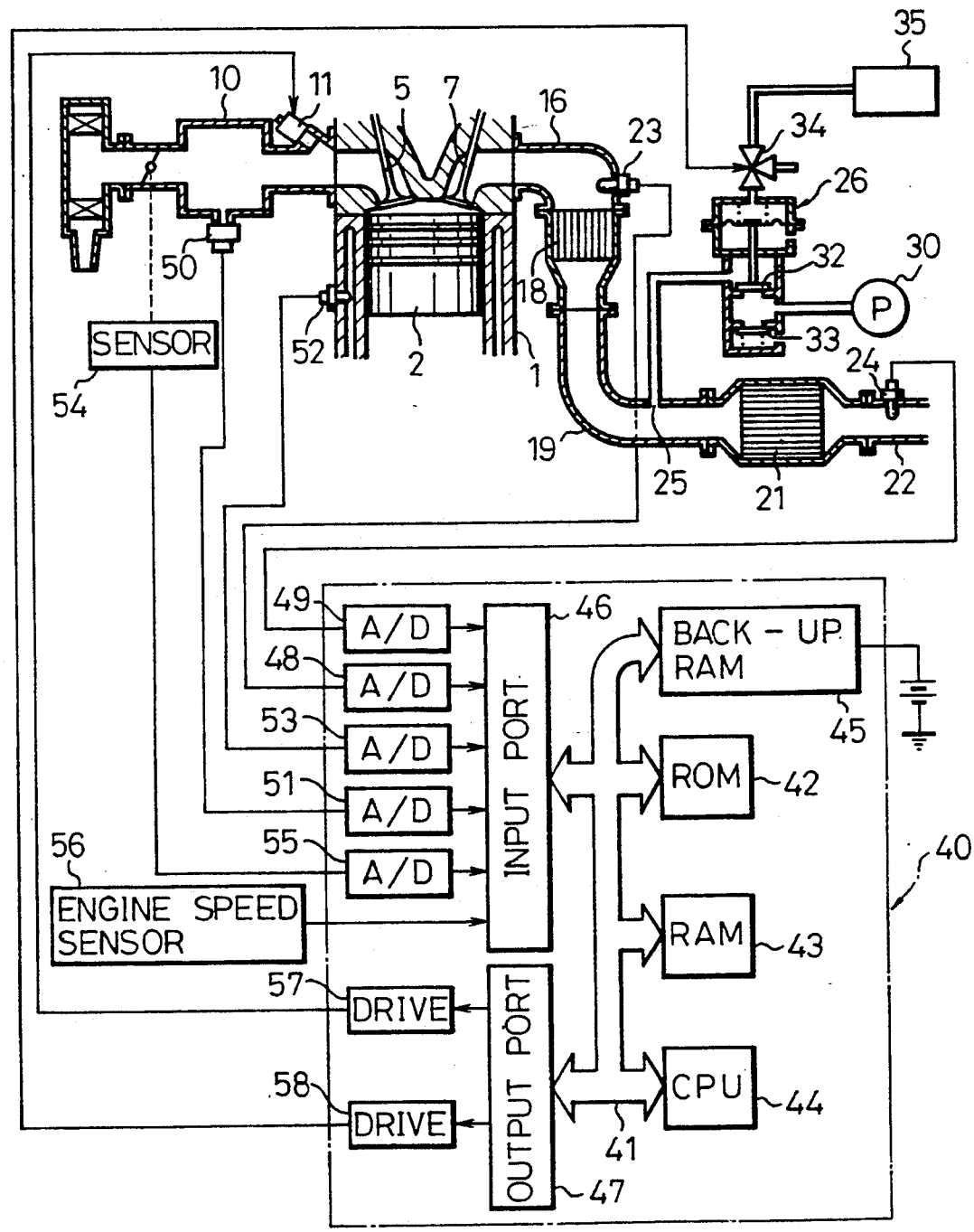
FIG. 16 is an overall view of another example of an internal combustion engine.

In the embodiments explained up to here, as shown in FIG. 1, the second $O_2$ sensor 24 was attached in the exhaust passage 19 upstream of the second three-way 20, catalyst 21. This second $O_2$ sensor 24 however, may also be positioned in the exhaust passage 22 downstream of the second three-way catalyst 21 as shown in FIG. 16.

Figure 17:
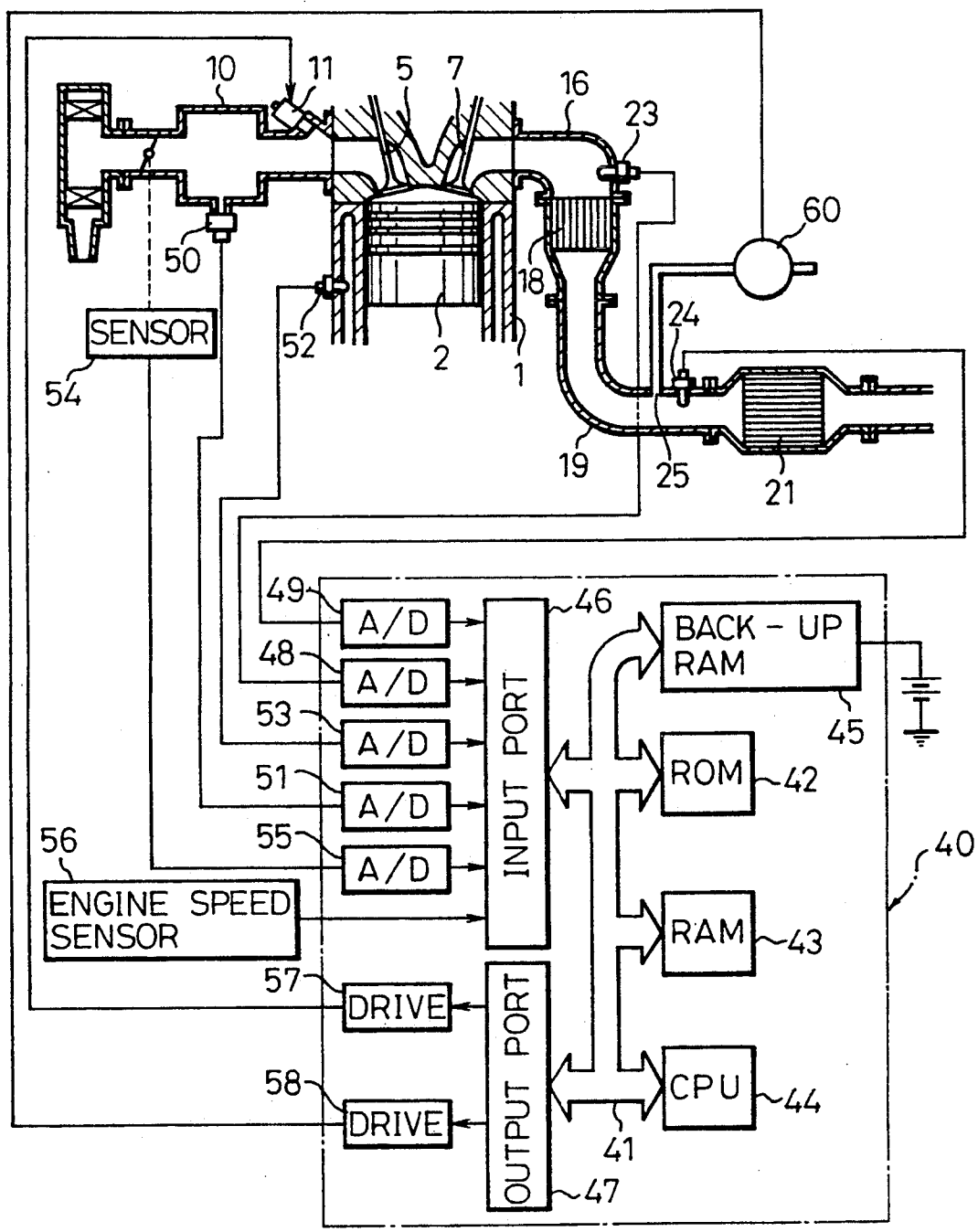
FIG. 17 is an overall view of still another example of an internal combustion engine.
Figures 19, 20:
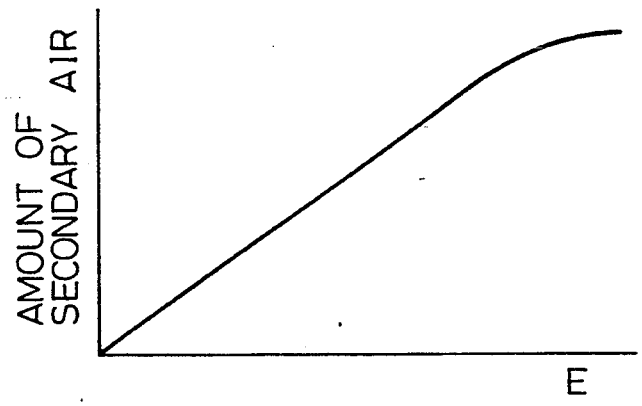
FIG. 19 is a view of the learning amount.
FIG. 20 is a view of the relationship between the voltage E and the amount of secondary air.

Further, in the embodiments explained up to here, as shown in FIG. 1, use was made of a secondary air feed control device 26 of a vacuum diaphragm type, but instead of this use may be made of an electrically driven air feed pump 60 with a variable discharge volume as shown in FIG. 17. FIG. 20 shows the relationship between the voltage E applied to the secondary air feed pump 60 and the discharge of the secondary air feed pump 60, that is, the amount of secondary air supplied from the secondary air feed port 25. The secondary air feed pump 60 is connected to the output port 47 through the drive circuit 59. The voltage E applied to the secondary air feed pump 60 is controlled based on the output signal of the electronic control unit 40.

In this embodiment too, as shown in FIG. 19, the learning amounts $EG_1$, $EG_2$, and $EG_3$ are given for the individual regions I, J, and K of FIG. 3A. Further, in this embodiment, the voltage E applied to the secondary air feed pump 60 is found by the sum of the voltage correction term EFG and the learning amount $EG_n$ (n=1, 2, 3). Next, an explanation will be made of the method of control of the feed of the secondary air in the case of use of the secondary air feed pump 60.

Figure 18:
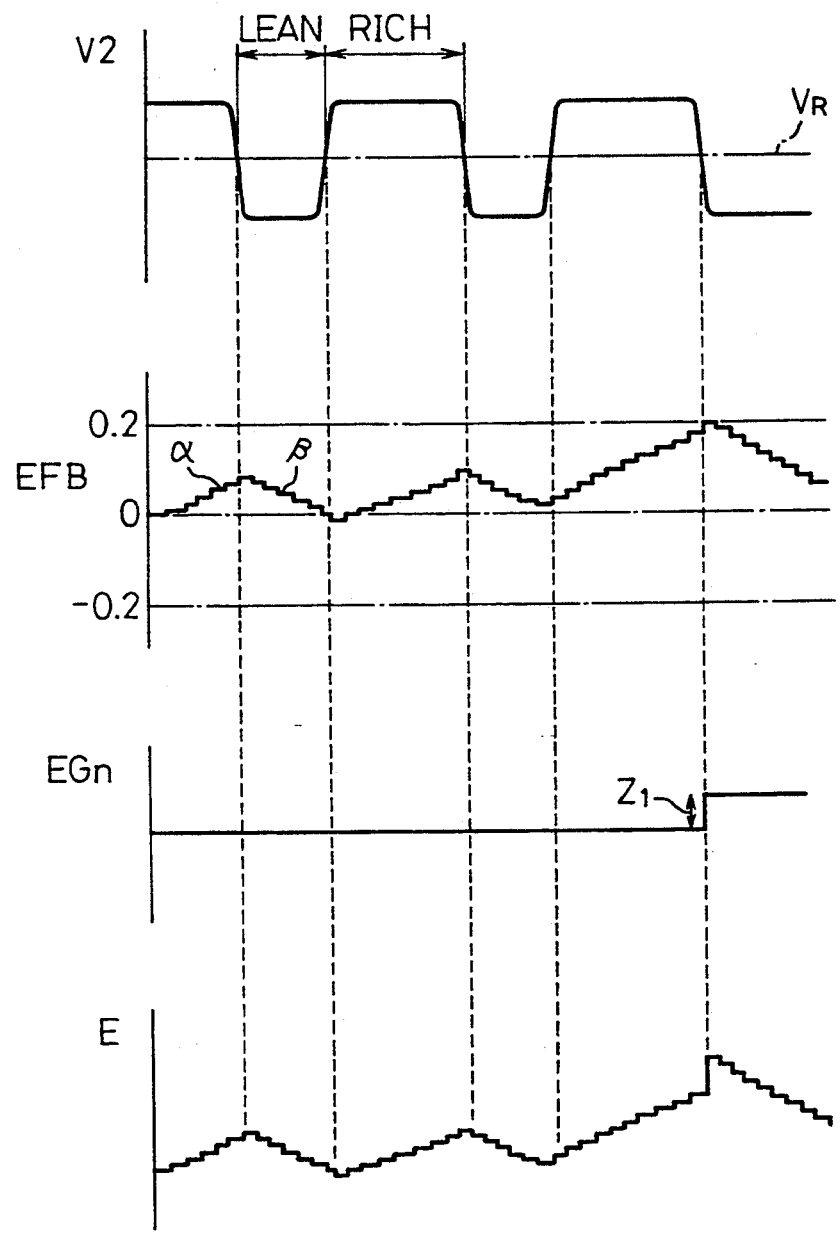
FIG. 18 is a view of the changes of the voltage E applied to the secondary air feed pump.

As mentioned earlier, the second $O_2$ sensor 24 issues an output voltage of about 0.1 V when the air-fuel ratio of the gas flowing around the second $O_2$ sensor 24, that is, the air-fuel ratio of the gas flowing into the second three-way catalyst 21, becomes lean and issues an output voltage of about 0.9 V when the air-fuel ratio of the gas flowing to the second three-way catalyst 21 becomes rich. As shown in FIG. 18, if the air-fuel ratio of the gas flowing into the second three-way catalyst 21 becomes rich, the voltage correction term EFB is increased gradually in steps of a predetermined value $\alpha$ and, along with this, the voltage E applied to the secondary air feed pump 60 is increased. If the voltage E increases, the amount of secondary air increases. If as a result the air-fuel ratio of the gas flowing into the second three-way catalyst 21 becomes lean, the voltage correction term EFB is gradually reduced in steps of a predetermined value $\beta$ and, along with this, the voltage E is reduced. As a result, the amount of secondary air is reduced and, then, the air-fuel ratio of the gas flowing to the second three-way catalyst 21 becomes rich. In this way, the air-fuel ratio of the gas flowing into the second three-way catalyst 21 is maintained at the stoichiometric air-fuel ratio. Note that, for example, if the voltage correction term EGB exceeds 0.2, the learning amount $EG_n$ is increased by the predetermined value $Z_1$ in the same way as in the embodiment explained with reference to FIG. 9.

Figure 21:
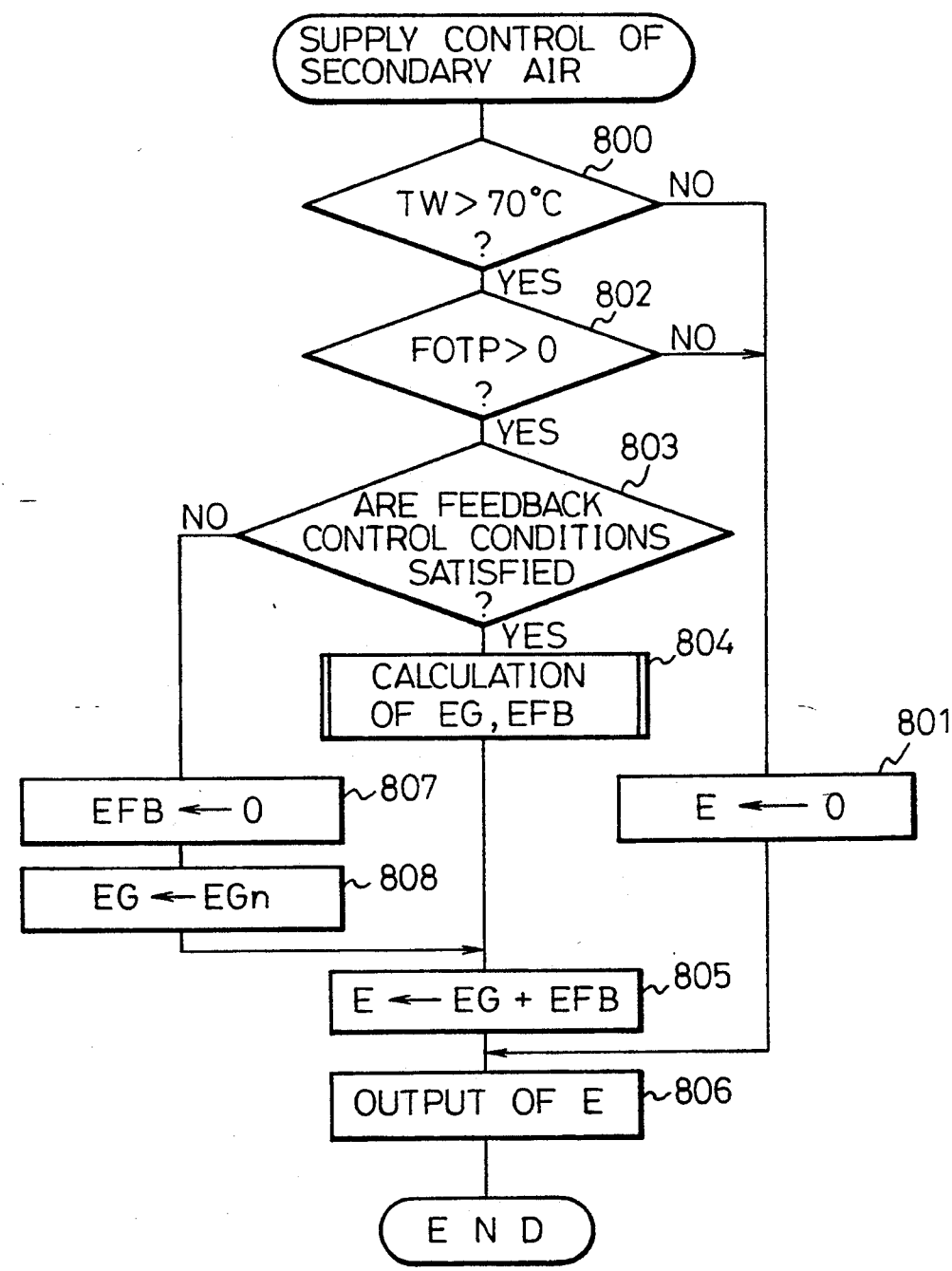
FIG. 21 is a flow chart of another example of the control of the feed of the secondary air.
Figure 22:
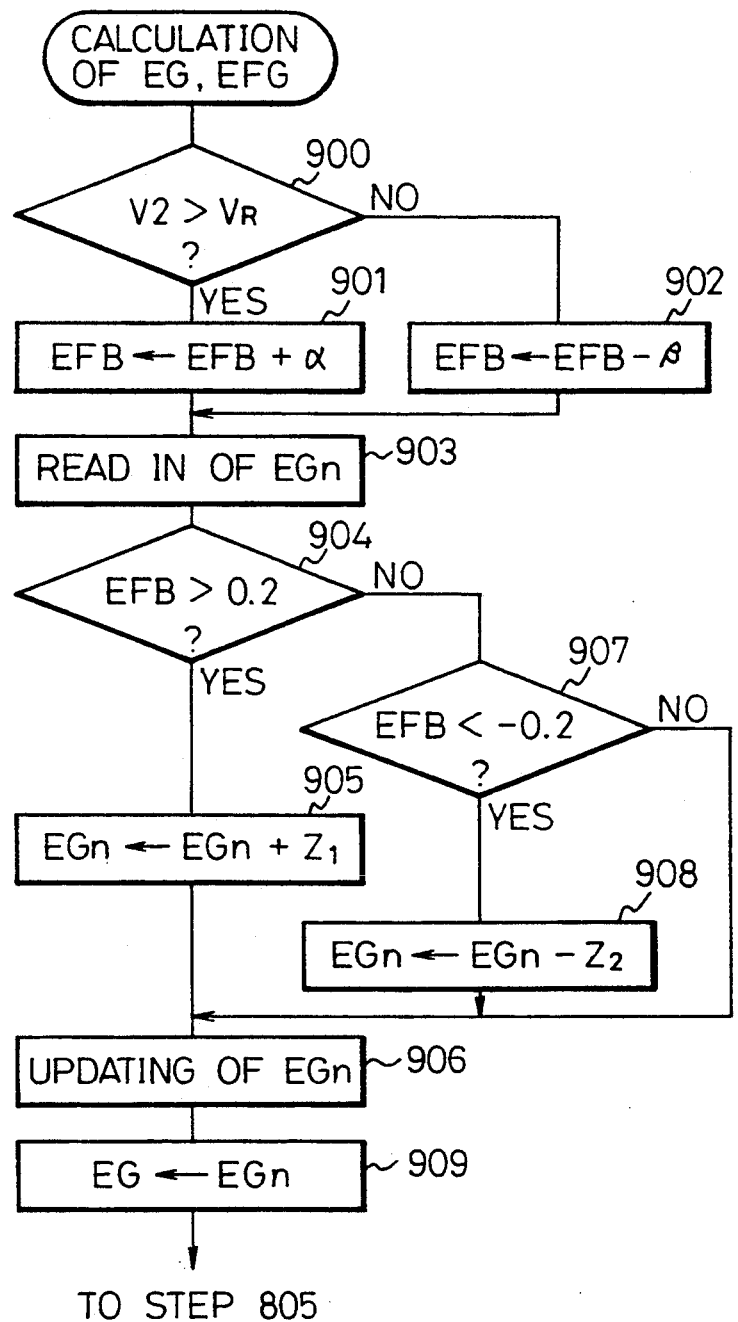
FIG. 22 is a flow chart of the calculation of the EG and EFB.

FIG. 21 and FIG. 22 show the routine for control of the supply of secondary air explained based on FIG. 18. This routine is executed, for example, by interruption every predetermined time interval.

Referring to FIG. 21, first, at step 800, it is determined if the engine coolant water temperature TW is higher than a predetermined value, for example, 70° C. When TW≦70° C., the routine proceeds to step 801, where the voltage E to be applied to the second air feed pump 60 is made zero, then at step 806, the voltage E is output. At this time, the supply of the secondary air is stopped. On the other hand, when TW>70° C., the routine proceeds to step 802, where it is determined if the increasing rate FOTP is a positive value. When FOTP=0, the routine proceeds through step 801 to step 806, where the supply of the secondary air is stopped.

On the other hand, when it is determined at step 802 that FOTP>0, that is, when a fuel increasing operation is being performed, the routine proceeds to step 803, where it is determined if the feedback conditions stand. When the temperature of the second $O_2$ sensor 24 becomes sufficiently high, it is determined that the feedback conditions stand. When it is determined that the feedback conditions stand, the routine proceeds to step 804, where the EG, EFB calculation routine shown in FIG. 22 is executed.

Referring to FIG. 23, first, at step 900, it is determined if the output voltage V2 of the second $O_2$ sensor 24 is higher than a reference value $V_R$. When $V2>V_R$, that is, when the air-fuel ratio of the gas flowing into the second three-way catalyst 21 is rich, the routine proceeds to step 901, where a predetermined value $\alpha$ is added to the voltage correction term EFB, then the routine proceeds to step 903. As opposed to this, when $V2 \leq V_R$, that is, when the air-fuel ratio of the gas flowing into the second three-way catalyst 21 is lean, the routine proceeds to step 902, where a predetermined value $\beta$ is subtracted from the voltage correction term EFB, then the routine proceeds to step 903. At step 903, it is determined which of the regions I, J, and K shown in FIG. 3A the current engine operating state falls into, and the learning amount $EG_1$, $EG_2$, or $EG_3$ of the regions I, J, or K where it falls (FIG. 19) is read from the backup RAM 45.

Next, at step 904, it is determined if the voltage correction term EFB is larger than 0.2. When EFB>0.2, the routine proceeds to step 905, where a predetermined value $Z_1$ is added to the learning amount $EG_n$ ($EG_1$, $EG_2$, or $EG_3$) read from the backup RAM 45, then the routine proceeds to step 906. On the other hand, when EFB≦0.2, the routine proceeds to step 907, where it is judged if the voltage correction term EFB is smaller than −0.2. When EFB<−0.2, the routine proceeds to step 908, where a predetermined value $Z_2$ is subtracted from the learning amount $EG_n$, then the routine proceeds to step 906. At step 906, the learning amount $EG_n$ stored in the backup RAM 45 is updated by the newly found learning amount $EG_n$. Next, at step 909, $EG_n$ is made EG, and the routine proceeds to step 805 of FIG. 21.

At step 805, the sum of the learning amount EG and the voltage correction term EFB is made the voltage E, then the routine proceeds to step 806, where the voltage E is output. At this time, the secondary air feed pump 60 is being driven and secondary air corresponding to the voltage E is supplied. Note that when it is determined at step 803 that the feedback conditions do not stand, the routine proceeds to stop 807, where the voltage correction term EFB is made zero. Next, at step 808, the learning amount $EG_n$ stored in the backup RAM 45 and reflecting the engine operating state is made EG, then the routine proceeds to step 805. Therefore, at this time, the voltage E becomes equal to the learning amount $EG_n$ and secondary air corresponding to the learning amount $EG_n$ is supplied.

According to the present invention, it is possible to prevent quick deterioration of the second three-way catalyst due to the supply of the secondary air and, further, it is possible to reduce the NOx, not to mention the unburnt HC and CO, by the second three-way catalyst.

While the invention has been described by reference to specific embodiments chosen for purposes of illustration, it should be apparent that numerous modifications could be made thereto by those skilled in the art without departing from the basic concept and scope of the invention.

I claim:

1. An engine having an exhaust passage, comprising:
a first catalyst arranged in the exhaust passage;
a second catalyst arranged in the exhaust passage downstream of said first catalyst;
a secondary air feed port open to the exhaust passage between said first catalyst and said second catalyst;
a first air-fuel ratio sensor arranged in the exhaust passage upstream of said first catalyst to detect an air-fuel ratio;
a second air-fuel ratio sensor arranged in the exhaust passage downstream of said secondary air-feed port to detect an air-fuel ratio;
enrichment means for increasing an amount of fuel fed into the engine to make an air-fuel ratio of a mixture, burned in the engine, the rich side of the stoichiometric air-fuel ratio when the engine is operating in a predetermined operating state;
an air-fuel ratio control means for carrying out feedback control of said air-fuel ratio of the mixture on the basis of an output signal of said first air-fuel ratio sensor so that an air-fuel ratio of gas flowing into said first catalyst becomes equal to the stoichiometric air-fuel ratio when an increasing operation of the amount of fuel by said enrichment means is not carried out, said air-fuel ratio control means stopping said feedback control when the increasing operation of the amount of fuel by said enrichment means is carried out; and
a secondary air feed control means for stopping the supply of secondary air to the exhaust passage from said secondary air feed port when the increasing operation of the amount of fuel by said enrichment means is not carried out, said secondary air feed control means causing the secondary air to flow into the exhaust passage from said secondary air feed port and carrying out feedback control of an amount of secondary air fed into the exhaust passage on the basis of an output signal of said second air-fuel ratio sensor so that an air-fuel ratio of gas flowing into said second catalyst becomes equal to the stoichiometric air-fuel ratio when the increasing operation of the amount of fuel by said enrichment means is carried out.

2. An engine according to claim 1, wherein said air-fuel ratio control means carries out the feedback control of said air-fuel ratio of the mixture on the basis of output signals of both said first air-fuel ratio sensor and said second air-fuel ratio sensor so that said air-fuel ratio of gas flowing into said first catalyst becomes equal to the stoichiometric air-fuel ratio when the increasing operation of the amount of fuel by said enrichment means is not carried out.

3. An engine according to claim 2, wherein said air-fuel ratio control means controls said air-fuel ratio of the mixture on the basis of the output signal of said first air-fuel ratio sensor so that said air-fuel ratio of gas flowing into the first catalyst becomes approximately equal to the stoichiometric air-fuel ratio, and said air-fuel ratio control means corrects said air-fuel ratio of the mixture on the basis of the output signal of said second air-fuel ratio sensor so that said air-fuel ratio of gas flowing into said first catalyst becomes precisely equal to the stoichiometric air-fuel ratio.

4. An engine according to claim 3, wherein said air-fuel ratio control means changes the amount of fuel fed into the engine by a predetermined amount in a skipping manner when the air-fuel ratio detected by said first air-fuel ratio sensor changes between the rich side and the lean side of the stoichiometric air-fuel ratio, and said air-fuel ratio control means changes said predetermined amount when the air-fuel ratio detected by said second air-fuel ratio sensor changes between the rich side and the lean side of the stoichiometric air-fuel ratio.

5. An engine according to claim 1, wherein said secondary air feed control means gradually increases said amount of secondary air when the air-fuel ratio detected by said second air-fuel ratio sensor is on the rich side of the stoichiometric air-fuel ratio and gradually decreases said amount of secondary air when the air-fuel ratio detected by said second air-fuel ratio sensor is on the lean side of the stoichiometric air-fuel ratio when the increasing operation of the amount of fuel by said enrichment means is carried out.

6. An engine according to claim 5, wherein said secondary air feed control means comprises
updating means for updating a learning amount of secondary air approximately representing said amount of secondary air to be fed into the exhaust passage when the increasing operation of the amount of fuel by said enrichment means is carried out and
memory means for storing said learning amount of secondary air when the increasing operation of the amount of fuel by said enrichment means is stopped and
said secondary air feed control means makes said amount of secondary air to be fed into the exhaust passage said learning amount of secondary air when said secondary air feed control means starts the feedback control of the amount of secondary air.

7. An engine according to claim 6, wherein said enrichment means comprises means for storing a plurality of different increasing rates of the amount of fuel, which rates differ in accordance with the operating state of the engine and
said learning amount of secondary air comprises a plurality of learning amounts of secondary air, which correspond to said increasing rates.

8. An engine according to claim 9, wherein said secondary air feed control means makes said amount of secondary air to be fed into the exhaust passage said learning amount of secondary air, which corresponds to said increasing rate determined by the operating state of the engine, when said secondary air feed control means starts the feedback control of the amount of secondary air.

9. An engine according to claim 6, wherein said enrichment means comprises means for storing a plurality of different increasing rates of the amount of fuel, which rates differ in accordance with the operating state of the engine, and only one learning amount of secondary air corresponding to one of said increasing rates is used.

10. An engine according to claim 9, wherein
said secondary air feed control means makes said amount of secondary air to be fed into the exhaust passage said learning amount of secondary air when the engine is operating in a state where said one of the increasing rates is used and when said secondary air feed control means starts the feedback control of the amount of secondary air and said secondary air feed control means makes said amount of secondary air to be fed into the exhaust passage an amount of secondary air calculated by both said learning amount of secondary air and said increasing rate when the engine is operating in a state where the other increasing rate is used and when said secondary air feed control means starts the feedback control of the amount of secondary air.

11. An engine according to claim 6, wherein said second air feed control means comprises a control signal producing means for producing a control signal and a secondary air feed control device for controlling the amount of secondary air fed into the exhaust passage from said secondary air feed port and increasing said amount of secondary air as a level of said control signal becomes high.

12. An engine according to claim 11, wherein the level of said control signal is determined by the sum of a first value representing said learning amount of secondary air and a second value which gradually increases and decreases when the air-fuel ratio detected by said second air-fuel ratio sensor is on the rich side and the lean side of the stoichiometric air-fuel ratio, respectively, and said updating means increases said second value when said first value exceeds a predetermined upper value and decreases said second value when said first value becomes smaller than a predetermined lower level.

13. An engine according to claim 11, wherein said secondary air feed control device comprises an air pump, a control valve arranged between said air pump and said secondary air feed port, a vacuum operated actuator actuating said control valve, and an electrically operated control valve controlling the level of vacuum acting on said actuator in response to said control signal.

14. An engine according to claim 11, wherein said secondary air feed control device comprises an air pump connected to said secondary air feed port and controlled in response to said control signal to change an amount of secondary air discharged from said air pump.

15. An engine according to claim 6, wherein said secondary air feed control means comprises means for determining whether or not a condition for carrying out the feedback control of the amount of secondary air is satisfied and said secondary air feed control means makes said amount of secondary to be fed into the exhaust passage said learning amount of secondary air during the time the increasing operation of the amount of fuel by said enrichment means is carried out when said condition is not satisfied.

* * * * *